(12) United States Patent
Chen et al.

(10) Patent No.: US 9,277,200 B2
(45) Date of Patent: Mar. 1, 2016

(54) DISABLING INTER-VIEW PREDICTION FOR REFERENCE PICTURE LIST IN VIDEO CODING

(71) Applicant: QUALCOMM Incorporated, San Diego, CA (US)

(72) Inventors: Ying Chen, San Diego, CA (US); Jewon Kang, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 14/157,401

(22) Filed: Jan. 16, 2014

(65) Prior Publication Data

US 2014/0198181 A1 Jul. 17, 2014

Related U.S. Application Data

(60) Provisional application No. 61/753,876, filed on Jan. 17, 2013.

(51) Int. Cl.
| | |
|---|---|
| *H04N 13/00* | (2006.01) |
| *H04N 7/12* | (2006.01) |
| *H04N 7/36* | (2006.01) |
| *H04N 19/597* | (2014.01) |
| *H04N 19/70* | (2014.01) |
| *H04N 19/573* | (2014.01) |
| *H04N 19/58* | (2014.01) |

(52) U.S. Cl.
CPC ....... *H04N 13/0011* (2013.01); *H04N 13/0048* (2013.01); *H04N 19/573* (2014.11); *H04N 19/58* (2014.11); *H04N 19/597* (2014.11); *H04N 19/70* (2014.11)

(58) Field of Classification Search
CPC .......... H04N 13/0011; H04N 13/0048; H04N 19/597; H04N 19/70; H04N 19/58; H04N 19/573
USPC ...................................................... 375/240.01
See application file for complete search history.

(56) References Cited

U.S. PATENT DOCUMENTS

| | | | |
|---|---|---|---|
| 2010/0098157 A1* | 4/2010 | Yang ..................... | H04N 19/597 375/240.12 |
| 2014/0078254 A1* | 3/2014 | Lin ....................... | H04N 19/597 348/43 |

OTHER PUBLICATIONS

ITU-T H.264, Jan. 2012.*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.

(Continued)

*Primary Examiner* — Hee-Yong Kim
(74) *Attorney, Agent, or Firm* — Shumaker & Sieffert, P.A.

(57) ABSTRACT

A video coder signals, in a bitstream, a syntax element that indicates whether inter-view/layer reference pictures are ever included in a reference picture list for a current view component/layer representation. A video decoder obtains, from the bitstream, the syntax element that indicates whether inter-view/layer reference pictures are ever included in a reference picture list for a current view component/layer representation. The video decoder decodes the current view component/layer representation.

25 Claims, 10 Drawing Sheets

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-11003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chuang, et al., "AHG9: Inter-Layer Prediction Flag and Inter-Layer Syntax Prediction Flag," No. JCTVC-L0071, Jan. 7, 2013, 5 pp.
Nakamura, et al., "Comments on SPS MVC extension", JVT Meeting; MPEG Meeting: Jan. 13-18, 2008; Antalya,; (Joint Video Team of ISO/IEC JTC1/SC29/WG11 and ITU-T SG.16), No. JVT-Z027, XP030007316, 13 pp.
Ramasubramonian, et al., "AHG7: Reference picture list initialization for MV-HEVC", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-every.fr/jct2/, No. JCT3V-C0060, XP030130476, 4 pp.
Wallendael, et al., "Multi-loop quality scalability based on high efficiency video coding", 2012 Picture Coding Symposium (PCS 2012); May 7-9, 2012; [Proceedings], IEEE, Piscataway, NJ, XP032449797, pp. 445-448
Zhang, et al., "3D-CE5.h related: Advanced residual prediction for multiview coding" JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG. 16 ); URL: http://phenix.int-every.fr/jct2/, No. JCT3V-B0051, XP030130232, 5 pp.
Zhang, et al., "CE5.h: Disparity vector generation results," JCT-3V Meeting: MPEG Meeting; Jul. 16-20, 2012, Document: JCT2-A0097, 5 pp.
Sung, et al., "3D-CE5.4: Simplification of disparity vector derivation for HEVC-based on 3D video coding," JCT-3V Meeting: MPEG Meeting; Jul. 16-20, 2012, Document: JCT2-A0126, 4 pp.
Tech, et al., "MV-HEVC Working Draft 1," JCT-3V Meeting, MPEG Meeting; Jul. 16-20, 2012, Document JCT3V-A1004_d0, 20 pp.
Tech, et al., "3D-HEVC Test Model 1," JCT-3V Meeting, MPEG Meeting; Jul. 16-20, 2012, Document JCT3V-A1005_d0, 83 pp.
Kang, et al., "3D-CE5.h related: Improvements for disparity vector derivation," JCT-3V Meeting, MPEG Meeting; Oct. 13-19, 2012, Document JCT3V-B0047, 4 pp.
Tech, et al., "MV-HEVC Draft Text 2," JCT-3V Meeting, MPEG Meeting; Oct. 13-19, 2012, Document JCT3V-B1004_d0, 22 pp.
Tech, et al., "3D-HEVC Test Model 2," JCT-3V Meeting, MPEG Meeting; Oct. 13-19, 2012, Document JCT3V-B1005_d0, 118 pp.
International Search Report and Written Opinion from International Application No. PCT/US2014/012047, dated Apr. 24, 2014, 12 pp.
Second Written Opinion from International Application No. PCT/US2014/012047, dated Feb. 6, 2015, 8 pp.
Response to Written Opinion dated Apr. 24, 2014, from International Application No. PCT/US2014/012047, filed on Oct. 8, 2014, 6 pp.
Response to Second Written Opinion dated Feb. 6, 2015, from International Application No. PCT/US2014/012047, filed on Mar. 30, 2015, 27 pp.
International Preliminary Report on Patentability from International Application No. PCT/US2014/012047, dated May 6, 2015, 10 pp.

\* cited by examiner

DISABLING INTER-VIEW PREDICTION FOR REFERENCE PICTURE LIST IN VIDEO CODING

This application claims the benefit of U.S. Provisional Patent Application No. 61/753,876, filed Jan. 17, 2013, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into blocks. Blocks in an intra-coded (I) slice of a picture are encoded using spatial prediction with respect to reference samples in neighboring blocks in the same picture. Blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

In general, this disclosure relates to the field of video coding, such as video encoders and decoders. Some examples relate to multi-view video coding based on advanced codecs, including the coding of two or more views with the High Efficiency Video Coding (HEVC) codec. More specifically, in some examples, a video decoder may obtain, from a bitstream, a syntax element that indicates whether inter-view/layer reference pictures are ever included in a reference picture list for a current view component/layer representation. In such examples, the video coder may decode the current view component/layer representation. Furthermore, some examples relate to disparity vector generation.

In one example, this disclosure describes a method for decoding video data, the method comprising: obtaining, from a bitstream, a syntax element that indicates whether inter-view/layer reference pictures are ever included in a reference picture list for a current view component/layer representation; and decoding the current view component/layer representation, wherein when the syntax element indicates that inter-view/layer reference pictures are never included in the reference picture list, the current view component/layer representation is decoded without use of inter-view/layer reference pictures in the reference picture list.

In another example, this disclosure describes a method of encoding video data, the method comprising: signaling, in a bitstream, a syntax element that indicates whether inter-view/layer reference pictures are ever included in a reference picture list for a current view component/layer representation; and encoding the current view component/layer representation, wherein when the syntax element indicates that inter-view/layer reference pictures are never included in the reference picture list, the current view component/layer representation is not encoded using inter-view/layer reference pictures in the reference picture list.

In another example, this disclosure describes a video decoding device comprising a storage medium and one or more processors coupled to the storage medium, the one or more processors configured to: obtain, from a bitstream, a syntax element that indicates whether inter-view/layer reference pictures are ever included in a reference picture list for a current view component/layer representation; and decode the current view component/layer representation, wherein when the syntax element indicates that inter-view/layer reference pictures are never included in the reference picture list, the current view component/layer representation is decoded without use of inter-view/layer reference pictures in the reference picture list.

In another example, this disclosure describes a video decoding device comprising: means for obtaining, from a bitstream, a syntax element that indicates whether inter-view/layer reference pictures are ever included in a reference picture list for a current view component/layer representation; and means for decoding the current view component/layer representation, wherein when the syntax element indicates that inter-view/layer reference pictures are never included in the reference picture list, the current view component/layer representation is decoded without use of inter-view/layer reference pictures in the reference picture list.

In another example, this disclosure describes a computer-readable data storage medium (e.g., a non-transitory computer-readable data storage medium) having instructions stored thereon that when executed cause a video decoding device to: obtain, from a bitstream, a syntax element that indicates whether inter-view/layer reference pictures are ever included in a reference picture list for a current view component/layer representation; and decode the current view component/layer representation, wherein when the syntax element indicates that inter-view/layer reference pictures are never included in the reference picture list, the current view component/layer representation is decoded without use of inter-view/layer reference pictures in the reference picture list.

In another example, this disclosure describes a video encoding device comprising a storage medium and one or more processors coupled to the storage medium, the one or more processors configured to: signal, in a bitstream, a syntax element that indicates whether inter-view/layer reference pictures are ever included in a reference picture list for a current view component/layer representation; and encoding the current view component/layer representation, wherein when the syntax element indicates that inter-view/layer reference pictures are never included in the reference picture list, the current view component/layer representation is not encoded using inter-view/layer reference pictures in the reference picture list.

In another example, this disclosure describes a video encoding device comprising means for signaling, in a bitstream, a syntax element that indicates whether inter-view/layer reference pictures are ever included in a reference picture list for a current view component/layer representation; and encoding the current view component/layer representation, wherein when the syntax element indicates that inter-view/layer reference pictures are never included in the reference picture list, the current view component/layer representation is not encoded using inter-view/layer reference pictures in the reference picture list.

In another example, this disclosure describes a computer-readable data storage medium (e.g., a non-transitory computer-readable data storage medium) having instructions stored thereon that when executed cause a video encoding device to: signal, in a bitstream, a syntax element that indicates whether inter-view/layer reference pictures are ever included in a reference picture list for a current view component/layer representation; and encoding the current view component/layer representation, wherein when the syntax element indicates that inter-view/layer reference pictures are never included in the reference picture list, the current view component/layer representation is not encoded using inter-view/layer reference pictures in the reference picture list.

The details of one or more examples of the disclosure are set forth in the accompanying drawings and the description below. Other features, objects, and advantages will be apparent from the description, drawings, and claims.

DETAILED DESCRIPTION

Figure 1:
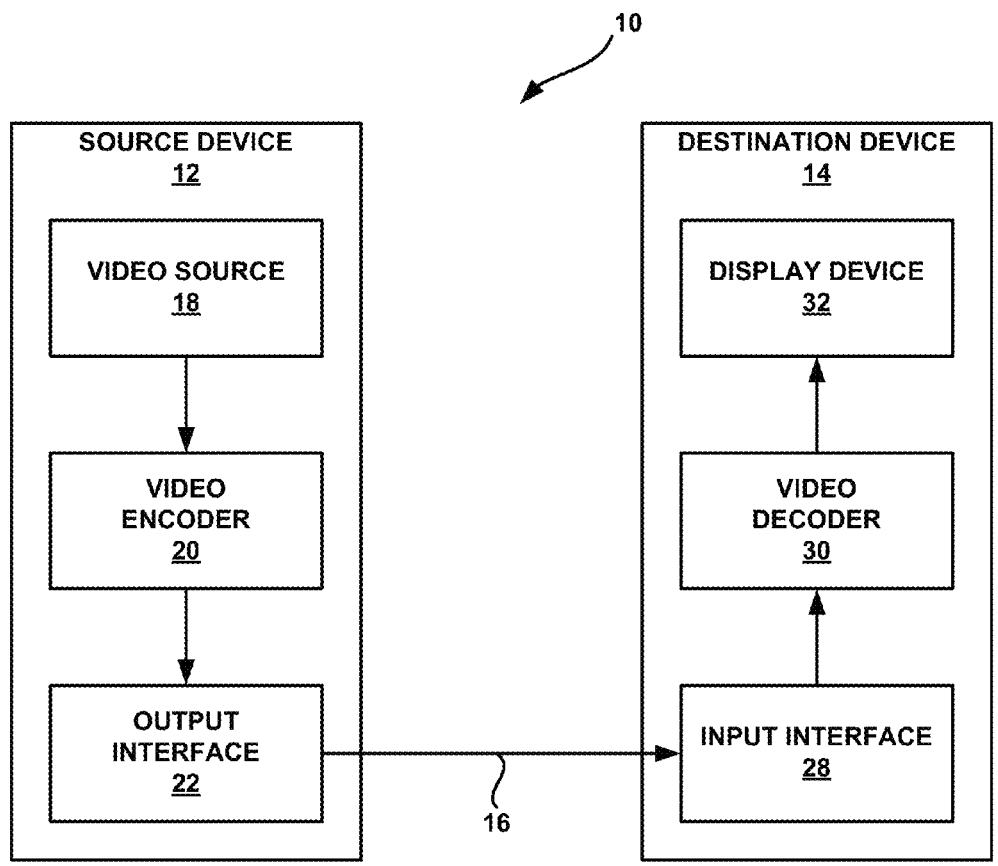
FIG. 1 is a block diagram illustrating an example video coding system that may utilize the techniques described in this disclosure.

High-Efficiency Video Coding (HEVC) is a newly-developed video coding standard. In HEVC and other video coding specifications or standards, a video encoder may generate up to two reference picture lists for each picture. These reference picture lists may be referred to as RefPicList0 and RefPicList1. The reference picture lists for a particular picture may include pictures that occur at different time instances than the particular picture. In other words, the reference picture lists may include temporal reference pictures.

When a video encoder encodes a picture, the video coder may generate encoded representations of blocks in the picture. The video encoder may use intra prediction or inter prediction to generate an encoded representation of a block of a picture. In other words, the video encoder may use intra prediction or inter prediction to encode the block. When the video encoder uses intra prediction to encode a current block of a current picture, the video encoder may generate a predictive block based on other samples in the current picture. When the video encoder uses inter prediction to encode the current block, the video encoder may determine a predictive block for the current block based on a corresponding block in a reference picture in the current picture's RefPicList0, based on a corresponding block in a reference picture in the current picture's RefPicList1, or based on a first corresponding block in a reference picture in the current picture's RefPicList0 and a second corresponding block in a reference picture in the current picture's RefPicList1. Regardless of whether the video encoder encodes the current block using intra prediction or inter prediction, the video encoder may determine a difference between the original content of the current block and the predictive block. The video encoder may transform and quantize the resulting residual data. The video coder may include, in a bitstream, entropy encoded syntax elements indicating the transformed and quantized residual data.

When a video decoder decodes a picture (i.e., the current picture), the video decoder may generate the same reference picture lists for the current picture. In addition, the video decoder may decode each block of the current picture. When the video decoder decodes a current block of the current picture, and the current block was encoded using inter prediction, the video decoder may determine, based on corresponding blocks in reference pictures in the current picture's RefPicList0 and/or RefPicList1, the predictive block for the current block. The video decoder may then reconstruct the current block by adding the predictive block to the residual data for the current block.

MV-HEVC is an extension of HEVC for multi-view (MV) coding. 3D-HEVC is an extension of HEVC for 3-dimensional (3D) video data. MV-HEVC and 3D-HEVC provide for multiple views of the same scene from different viewpoints. In MV-HEVC and 3D-HEVC, inter-view prediction based on the reconstructed pictures from different views may be enabled. In MV-HEVC and 3D-HEVC, the reference picture lists for a current picture may include inter-view reference pictures as well as temporal reference pictures. The inter-view reference pictures may be in different views than the current picture. Video encoders and video decoders may use the inter-view reference pictures in the reference picture lists in a manner similar to temporal reference pictures.

In MV-HEVC and 3D-HEVC, some coding tools used by video encoders and video decoders assume that both RefPicList0 and RefPicList1 include inter-view reference pictures. For instance, coding tools for determining a disparity vector for a block may assume that both RefPicList0 and RefPicList1 include inter-view reference pictures. As a result of this assumption, the complexity of such coding tools may increase because the coding tools may need to check whether reference pictures in both reference picture lists are inter-view reference pictures. Furthermore, checking whether a reference picture in RefPicList1 is an inter-view reference picture may result in additional read and write requests to memory, which may slow the encoding and/or decoding process. However, including the same inter-view reference pictures in RefPicList0 and RefPicList1 may not result in any coding gain.

Accordingly, in some instances, it may be advantageous to include inter-view reference pictures in RefPicList0, but not RefPicList1. Hence, in accordance with particular examples of this disclosure, if a video encoder signals, in a bitstream, that inter-view reference pictures are not included in RefPicList1, particular coding tools used by the video decoder do not need to check whether reference pictures in RefPicList1 are inter-view reference pictures. This may reduce complexity and the number of read and write requests to memory. Furthermore, if the video encoder signals in the bitstream that inter-view reference pictures are not included in RefPicList1, the video encoder may not need to signal particular syntax elements in the bitstream. For instance, if there are no inter-view reference pictures in RefPicList1, the video encoder may signal how to modify the order of reference pictures in RefPicList1 using reference picture list modification (RPLM) syntax elements that include fewer bits.

Hence, in accordance with an example of this disclosure, a video encoder may signal, in a bitstream, a syntax element that indicates whether inter-view/layer reference pictures are ever included in a reference picture list for a current picture. In addition, the video encoder may encode the current picture. Similarly, a video decoder may obtain, from a bitstream, a syntax element that indicates whether inter-view reference pictures are ever included in a reference picture list for a current picture. In addition, the video decoder may decode the current picture. As described herein, examples of this disclosure may apply to scalable video coding (SVC), as well as multi-view coding and 3DV coding.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data (e.g., video data) is retrieved from a local memory, streamed over a network, or the like. A video encoding device may encode and store data (e.g., video data) to memory, and/or a video decoding device may retrieve and decode data (e.g., video data) from memory. In many examples, the encoding and decoding is performed by devices that do not communicate with one another, but simply encode data (e.g. video data) to memory and/or retrieve and decode data (e.g., video data) from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, general purpose processors digital signal processors (DSPs), application-specific integrated circuits (ASICs), field-programmable gate arrays (FPGAs), discrete logic, hardware, or any combinations thereof to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device or in a bitstream, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. Furthermore, there is an ongoing effort to generate a three-dimensional video (3DV) coding extension to H.264/AVC, namely AVC-based 3DV. A joint draft of the MVC extension of H.264 is described in "Advanced video coding for generic audiovisual services," ITU-T Recommendation H.264, March 2010. In other examples, video encoder 20 and video decoder 30 may operate according to ITU-T H.261, ISO/IEC MPEG-1 Visual, ITU-T H.262 or ISO/IEC MPEG-2 Visual, and ITU-T H.263, ISO/IEC-4 Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" or the "HEVC base specification" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012. As of Jan. 9, 2014, HEVC Working Draft 8 is available for download from http://phenix.int-evry.fr/jct/doc_end_user/documents/10_Stockholm/wg11/JCTVC-J1003-v8.zip. A scalable video coding extension of HEVC, referred to as SHVC, is in development.

Furthermore, there are ongoing efforts to produce multi-view coding and 3DV extensions for HEVC. In other words, a Joint Collaboration Team on 3D video Coding (JCT-3V) of VCEG and MPEG is developing a 3DV standard based on HEVC, for which part of the standardization efforts includes the standardization of the multi-view video codec based on HEVC (MV-HEVC) and another part for 3D Video coding based on HEVC (3D-HEVC). Video encoder 20 and video decoder 30 may operate according to such extensions to the HEVC standard. The multi-view coding extension of HEVC may be referred to as MV-HEVC. Gerhard Tech et al., "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting:

Stockholm, SE, 16-20 Jul. 2012 (hereinafter, "JCT3V-A1004" or "MV-HEVC Working Draft 1"), provides a working draft for MV-HEVC. Gerhard Tech et al., "MV-HEVC Working Draft 2," JCT3V-B1004, Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012 (hereinafter, "MV-HEVC Working Draft 2"), provides another working draft for MV-HEVC.

The 3DV extension of HEVC may be referred to as 3D-HEVC. Tech et al., "Draft of 3D-HEVC Test Model Description Draft," JCT3V-B1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "3D-HEVC Test Model 1") describes reference software as well as a working draft of 3D-HEVC. In addition, Tech et al., "3D-HEVC Test Model Description Draft 2," JCT3V-B1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "3D-HEVC Test Model Description Draft 2") describes reference software as well as a working draft of 3D-HEVC. As of Jan. 9, 2014, reference software for 3D-HEVC, namely 3DV-HTM is available from https://hevc.hhi.fraunhofer.de/svn/svn_3DVCSoftware/trunk.

HEVC provides for a motion compensation loop. In general, the motion compensation loop of HEVC is the same as that in H.264/AVC. For example, the reconstruction of a current frame $\hat{I}$ may equal de-quantized coefficients r plus temporal prediction P:

$$\hat{I} = r + P.$$

In the formula above, P indicates uni-directional prediction for P frames or bi-directional prediction for B frames.

However, the unit of motion compensation in HEVC is different from that in previous video coding standards. For example, the concept of a macroblock in previous video coding standards does not exist in HEVC. Rather, macroblocks are replaced by a highly flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction and a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs or CUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU. Hence, in this disclosure, a CU may be said to be partitioned into one or more PUs. For ease of explanation, this disclosure may refer to the size of a prediction block of a PU as simply the size of the PU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture associated with the PU. In this disclosure, the phrase "based on" may indicate "based at least in part on."

If video encoder 20 uses inter prediction to generate the predictive blocks of a PU, video encoder 20 may generate the predictive blocks of the PU based on decoded samples of one or more pictures other than the picture associated with the PU.

When inter prediction is used to generate the predictive blocks of a block (e.g., a PU), this disclosure may refer to the block as "inter-coded" or "inter predicted." Inter prediction may be uni-directional (i.e., uni-prediction) or bi-directional (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Each sample in a predictive block for the PU may be associated with the reference location. In some examples, a sample in a predictive block for a PU may be associated with a reference location when the sample is within a block of samples having the same size as the PU and whose top-left corner is the reference location. Each sample in a predictive block may be an actual or interpolated sample of the reference picture. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Each sample in the predictive block may be a weighted average of corresponding samples in the reference blocks. The weighting of the samples may be based on temporal distances of the reference pictures from the picture containing the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location. Thus, when video encoder 20 performs bi-prediction on a PU, the PU has two motion vectors.

If video encoder 20 uses inter prediction to generate the predictive blocks of a PU, video encoder 20 may generate the predictive blocks of the PU based on samples of one or more pictures other than the picture associated with the PU. For instance, video encoder 20 may perform uni-directional inter prediction (i.e., uni-prediction) or bi-directional inter prediction (i.e., bi-prediction) on a PU.

Video encoder 20 may partition a CU into one or more PUs according various partitioning modes. For instance, if intra prediction is used to generate predictive blocks for the PUs of a CU, the CU may be partitioned according to a PART_2N×2N mode or a PART_N×N mode. In the PART_2N×2N mode, the CU only has one PU. In the PART_N×N mode, the CU has four equally-sized PUs having rectangular prediction blocks. If the inter prediction is used to generate predictive blocks for the PUs of a CU, the CU may be partitioned according to the PART_2N×2N mode, the PART_N×N mode, a PART_2N×N mode, a PART_N×2N mode, a PART_2N×nU mode, a PART_2N×uD mode, a PART_nL×2N mode, or a PART_nR×2N mode. In the PART_2N×N mode and the PART_N×2N mode, the CU is partitioned into two equally-sized PUs having rectangular prediction blocks. In each of the PART_2N×nU mode, the PART_2N×uD mode, the PART_nL×2N mode, and the PART_nR×2N mode, the CU is partitioned into two unequally-sized PUs having rectangular prediction blocks. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

After video encoder 20 generates one or more predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the one or more residual block of a CU (e.g., luma, Cb, and Cr residual blocks of the CU) into one or more transform blocks (e.g., luma, Cb, and Cr transform blocks). A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. For example, video encoder 20 may apply one or more transforms to a luma transform block of a TU to generate a luma coefficient block for the TU. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. In other words, video encoder 20 may generate a bitstream that comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). A CVS may comprise a sequence of pictures. In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit. In HEVC, an access unit may be a set of NAL units that are consecutive in decoding order and contain exactly one coded picture. In addition to the coded slice NAL units of the coded picture, the access unit may also contain other NAL units not containing slices of the coded picture. The decoding of an access unit always results in a decoded picture.

A VPS is a syntax structure comprising syntax elements that apply to zero or more (e.g., one or more) entire CVSs. One or more SPS's may include syntax elements that identify that the same VPS is active when the SPSs are active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge/skip mode or advanced motion vector prediction (AMVP) mode. In other words, in HEVC, there are two modes for the prediction of motion parameters, one being the merge/skip mode and the other being AMVP. Motion prediction may comprise the determination of motion information of a block (e.g., a PU) based on motion information of one or more other blocks. The motion information (i.e., motion parameters) of a PU may include motion vector(s) of the PU, reference index(s) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) may be constructed where candidates can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate. Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) syntax element (e.g., flag) for the current PU. The RefPicListX MVP syntax element for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP syntax element, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP syntax element. Video decoder 30 may generate the same AMVP candidate list and may determine, based on the MVP syntax element, the selected AMVP candidate. In other words, in AMVP, a candidate list of motion vector predictors for each motion hypothesis is derived based on the coded reference index. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder generates a merge candidate list or an AMVP candidate list for a current PU, the video coder may derive one or more candidates based on the motion information of PUs (i.e., spatially-neighboring PUs) that cover locations that spatially neighbor the current PU and the video coder may derive one or more candidates based on motion information of PUs that temporally neighbor the current PU. In this disclosure, a PU (or other type of block) may be said to "cover" a location if a prediction block associated with the PU (or other type of sample block associated with the block) includes the location. Furthermore, in this disclosure, a first PU may spatially neighbor a second PU when a prediction block of the first PU is adjacent in a picture to a prediction block of the second PU. The candidate list may include motion vectors of neighboring blocks that are associated with the same reference index as well as a temporal motion vector predictor which is derived based on the motion parameters (i.e., motion information) of a block in a temporal reference picture.

Figure 2:
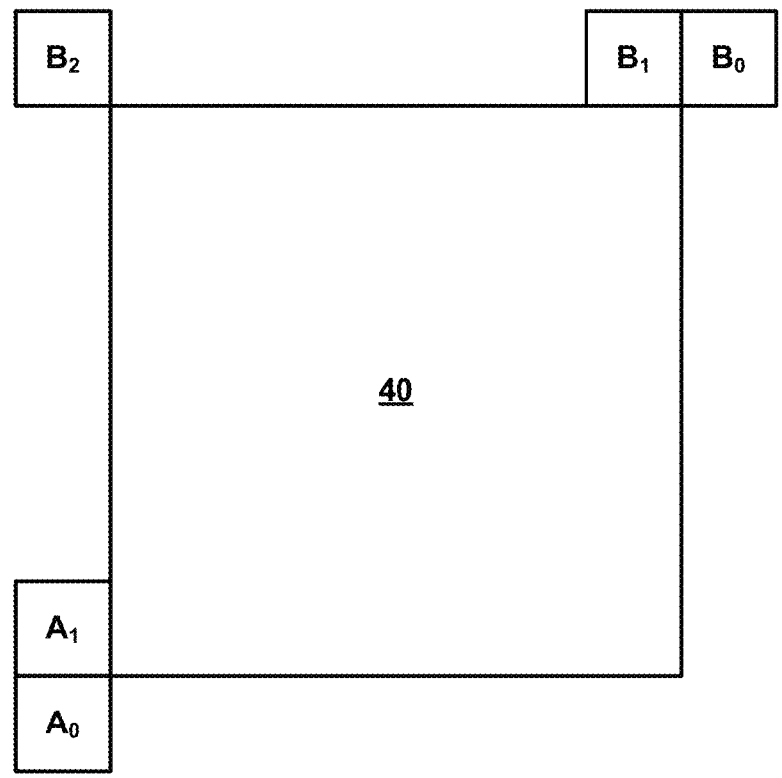
FIG. 2 is a conceptual diagram illustrating example spatially-neighboring prediction units (PUs) relative to a current PU.

FIG. 2 is a conceptual diagram illustrating example spatially-neighboring PUs relative to a current PU 40. In the example of FIG. 2, the spatially-neighboring PUs may be PUs that cover the locations indicated as $A_0, A_1, B_0, B_1,$ and $B_2$. In other words, an example relationship between current PU 40 and its spatial neighboring PUs is depicted in FIG. 2.

With regard to the spatial neighbor PUs, the following symbols may be defined:

A luma location (xP, yP) is used to specify the top-left luma sample of the current PU relative to the top-left sample of the current picture;

Variables nPSW and nPSH denote the width and the height of the PU for luma;

The top-left luma sample of the current PU N relative to the top-left sample of the current picture is (xN, yN).

(xN, yN) (with N being replaced by $A_0, A_1, B_0, B_1$ or $B_2$) is defined as (xP−1, yP+nPSH), (xP−1, yP+nPSH−1), (xP+nPSW, yP−1), (xP+nPSW−1, yP−1) or (xP−1, yP−1), respectively.

A candidate in a merge candidate list or an AMVP candidate list that is based on the motion information of a PU that temporally neighbors a current PU (i.e., a PU that is associated with a different time instance than the current PU) may be referred to as a TMVP. A TMVP may be used to improve the coding efficiency of HEVC and, different from other coding tools, a TMVP may need to access a motion vector of a picture in a decoded picture buffer (e.g., a picture in a reference picture list).

To determine a TMVP, a video coder may firstly identify a reference picture that includes a PU that is co-located with the current PU. In other words, the video coder may identify a so-called "co-located picture." If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated_from_l0_flag) in a slice header to indicate whether the co-located picture is in RefPicList0 or RefPicList1.

A syntax element (e.g., collocated_ref_idx) in a slice header may indicate a co-located picture in the identified reference picture list. Thus, after video decoder 30 identifies the reference picture list that includes the co-located picture, video decoder 30 may use collocated_ref_idx, which may be signaled in a slice header, to identify the co-located picture in the identified reference picture list. The video coder may identify a co-located PU by checking the co-located picture. The TMVP may indicate either the motion information of a right-bottom PU a co-located PU, or the motion information of a center PU of the co-located PU.

When the video coder generates a motion vector candidate (e.g., a candidate in a merge list of an AMVP candidate list) that specifies a motion vector of a TMVP in a temporal reference picture, the video coder may scale the motion vector of the TMVP based on the temporal location (reflected by POC value) of the temporal reference picture. In other words, the video coder may scale a motion vector of the motion vector candidate based on a POC distance between the current picture and the reference picture. For instance, when a video coder scales a motion vector based on a POC distance between a first picture and a second picture, the video coder may increase the magnitude of the motion vector by greater amounts when a difference between the POC values of the first picture and the second picture is greater than when a difference between the POC values of the first picture and the second picture is less.

The target reference index of all possible reference picture lists for the temporal merging candidate derived from a TMVP may be always set to 0. The target reference index may identify a reference picture used for motion compensation. However, for AMVP, the target reference index of all possible reference pictures is set equal to the decoded reference index. In HEVC, a SPS may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a TMVP in decoding of the particular picture or a picture after the particular picture in decoding order.

The techniques of this disclosure are potentially applicable to multi-view coding and/or 3DV standards and specifications, including MV-HEVC and 3D-HEVC. In MV-HEVC, there may only be high-level syntax (HLS) changes, such that no module at the CU or PU level in HEVC needs to be re-designed. This may allow modules configured for HEVC to be reused for MV-HEVC. For 3D-HEVC, new coding tools, including those in CU and/or PU level, for both texture and depth views may be included and supported.

Different codec extensions to HEVC (e.g., MV-HEVC, 3D-HEVC, SHVC, etc.) may define different extensions to various syntax structures defined in HEVC. The extensions to the syntax structures may include syntax elements specific to the codec extensions. For example, MV-HEVC may define an extension for VPSs and 3D-HEVC may define a different extension for VPSs.

In multi-view coding, such as that defined in MV-HEVC and 3D-HEVC, there may be multiple views of the same scene from different viewpoints. In the context of multi-view coding and 3DV coding, the term "access unit" is used to refer to the set of pictures that correspond to the same time instance. Specifically, in MV-HEVC and 3D-HEVC, an access unit may be a set of NAL units that are consecutive in decoding order and contain exactly one coded picture consisting of one or more view components. In addition to the coded slice NAL units of the coded picture, the access unit may also contain other NAL units not containing slices of the coded picture. In some examples, the decoding of an access unit always results in one decoded picture consisting of one or more decoded view components. Thus, video data may be conceptualized as a series of access units occurring over time. A "view component" may be a coded representation of a view in a single access unit. A view component may comprise a texture view component and a depth view component. In this disclosure, a "view" may refer to a sequence of view components associated with the same view identifier.

A texture view component (i.e., a texture picture) may be a coded representation of the texture of a view in a single access unit. A texture view may be a sequence of texture view components associated with an identical value of view order index. A view order index of a view may indicate a camera position of the view relative to other views. A depth view component (i.e., a depth picture) may be a coded representation of the depth of a view in a single access unit. A depth view may be a sequence of depth view components associated with an identical value of view order index.

In multi-view coding, 3DV coding, and scalable video coding, a bitstream may have a plurality of layers. In multi-view coding and 3DV coding, such as that defined in MV-HEVC and 3D-HEVC, the layers may correspond to different views. A view may be referred to as a "base layer" (or "base view") if a video decoder (e.g., video decoder 30) can decode pictures associated with the layer without reference to pictures in any other layer. A layer may be referred to as a non-base layer (e.g., a non-base view) if decoding of the layer is dependent on decoding of pictures associated with one or more other layers (e.g., views).

In SVC, layers other than the base layer may be referred to as "enhancement layers" and may provide information that enhances the visual quality of video data decoded from the bitstream. In scalable video coding (e.g., SHVC), a "layer representation" may be a coded representation of a spatial layer in a single access unit. For ease of explanation, this disclosure may refer to view components and/or layer representations as "view components/layer representations."

To implement the layers, headers of NAL units may include nuh_reserved_zero_6bits syntax elements. NAL units that have nuh_reserved_zero_6bit syntax elements that specify different values belong to different "layers" of a bitstream. Thus, in multi-view coding, 3DV, or SVC, the nuh_reserved_zero_6bits syntax element of a NAL unit specifies a layer identifier (i.e., a layer ID) of the NAL unit. In some examples, the nuh_reserved_zero_6bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6bits syntax element may have a non-zero value. As indicated above, in multi-view coding and 3DV coding, different layers of a bitstream may correspond to different views.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers of the NAL units. The temporal identifier of a NAL unit identifies a sub-layer to which the NAL unit belongs. Thus, each sub-layer of a bitstream may have a different temporal identifier. In general, if the temporal identifier of a first NAL unit is less than the temporal identifier of a second NAL unit, the data encapsulated by the first NAL unit may be decoded without reference to the data encapsulated by the second NAL unit.

Multi-view coding may support inter-view prediction. Inter-view prediction is similar to the inter prediction used in H.264/AVC, HEVC, or other video coding specifications and may use the same syntax elements. However, when a video coder performs inter-view prediction on a current block (such as a macroblock or PU), the video coder may use, as a reference picture, a picture that is in the same access unit as the current block, but in a different view. In other words, in multi-view coding, inter-view prediction is performed among pictures captured in the different views of the same access unit (i.e., within the same time instance) to remove correlation between views. In contrast, conventional inter prediction only uses pictures in different access units as reference pictures.

Thus, when coding a picture (i.e., a current picture) in a non-base view, a video coder (such as video encoder 20 or video decoder 30) may include an inter-view reference picture in a reference picture list. The inter-view reference picture is in a different view than the current picture and in the same time instance (i.e., access unit) as the current picture. The video coder may insert an inter-view reference picture at any position of a reference picture list. In other words, a picture coded with inter-view prediction may be added into a reference picture list for the inter-view prediction of the other non-base views.

Figure 3:
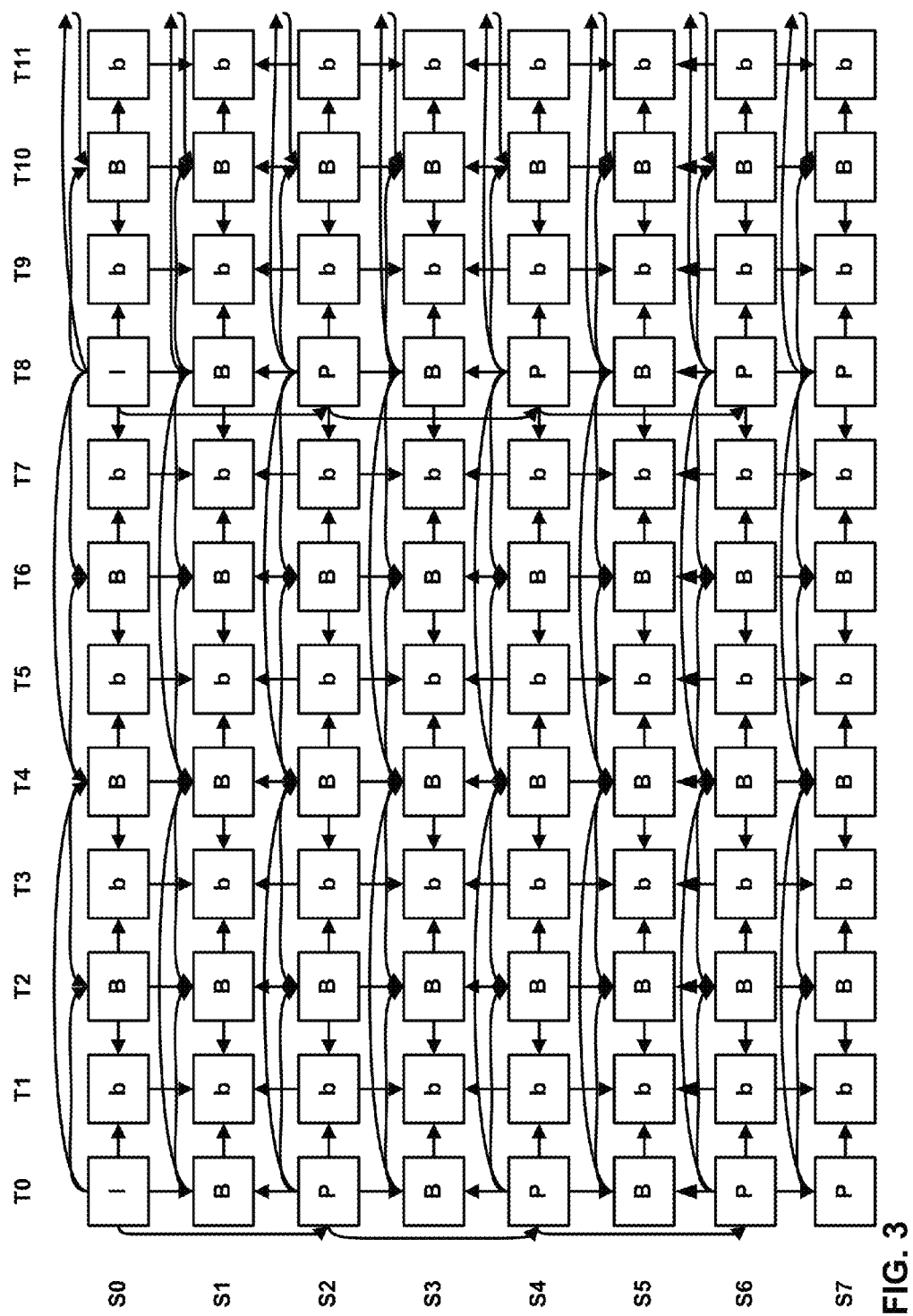
FIG. 3 is a conceptual diagram illustrating an example prediction structure for multi-view coding.

FIG. 3 is a conceptual diagram illustrating an example prediction structure for multi-view coding. The multi-view prediction structure of FIG. 3 includes temporal and inter-view prediction. In the example of FIG. 3, each square corresponds to a view component. In the example of FIG. 3, access units are labeled T0 . . . T11 and views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 3, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multi-view representation. Consequently, any renderer with a MVC decoder may expect 3D video contents with more than two views.

In the context of multi-view video coding, there are two kinds of motion vectors. One kind of motion vector is a normal motion vector that points to a temporal reference picture. The type of inter prediction corresponding to a normal, temporal motion vector may be referred to as motion-compensated prediction (MCP). When an inter-view prediction reference picture is used for motion compensation, the corresponding motion vector may be referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

Scalable video coding may implement inter-layer prediction in a manner similar to the inter-view prediction described in this disclosure. In general, inter-layer prediction is a prediction in manner that is dependent on data elements (e.g. sample values or motion vectors) of reference pictures with another value of nuh_layer_id than that for the current picture. Thus, a reference picture used in inter-layer prediction may be referred to as an "inter-layer reference picture." For ease of explanation, this disclosure may refer to inter-view reference pictures and/or inter-layer reference pictures as "inter-view/layer reference pictures."

MV-HEVC and 3D-HEVC may improve coding efficiency using inter-view motion prediction and inter-view residual prediction. In inter-view motion prediction, a video coder may determine (i.e., predict) the motion information of a current PU based on the motion information of a PU in a different view than the current PU. In other words, a corresponding block of the current PU is identified by a disparity vector, and the motion vectors of the corresponding block may be used as an additional candidate of the AMVP or merge list of the current PU. In addition, the disparity vector may be converted to a disparity motion vector and added into the AMVP or merge list. In inter-view residual prediction, a video coder may determine residual blocks of a current CU based on residual data in a different view than the current CU. That is, in inter-view residual prediction, if the corresponding blocks of the current CU contain non-zero residual pixels, the residue of the blocks are used to predict the residue of the current CU.

To enable inter-view motion prediction and inter-view residual prediction, a video coder may determine disparity vectors for blocks (e.g., PUs, CUs, etc.). In general, a disparity vector is used as an estimator of the displacement between two views. A video coder may use a disparity vector for a block either to locate a reference block in another view for inter-view motion or residual prediction, or the video coder may convert the disparity vector to a disparity motion vector for inter-view motion prediction.

L. Zhang et al., "3D-CE5.h related: Advanced residual prediction for multiview coding," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0051 (hereinafter, "JCT3V-B0051"), proposed an advanced residual prediction (ARP) method to further improve the coding efficiency of inter-view residual prediction.

Figure 4:
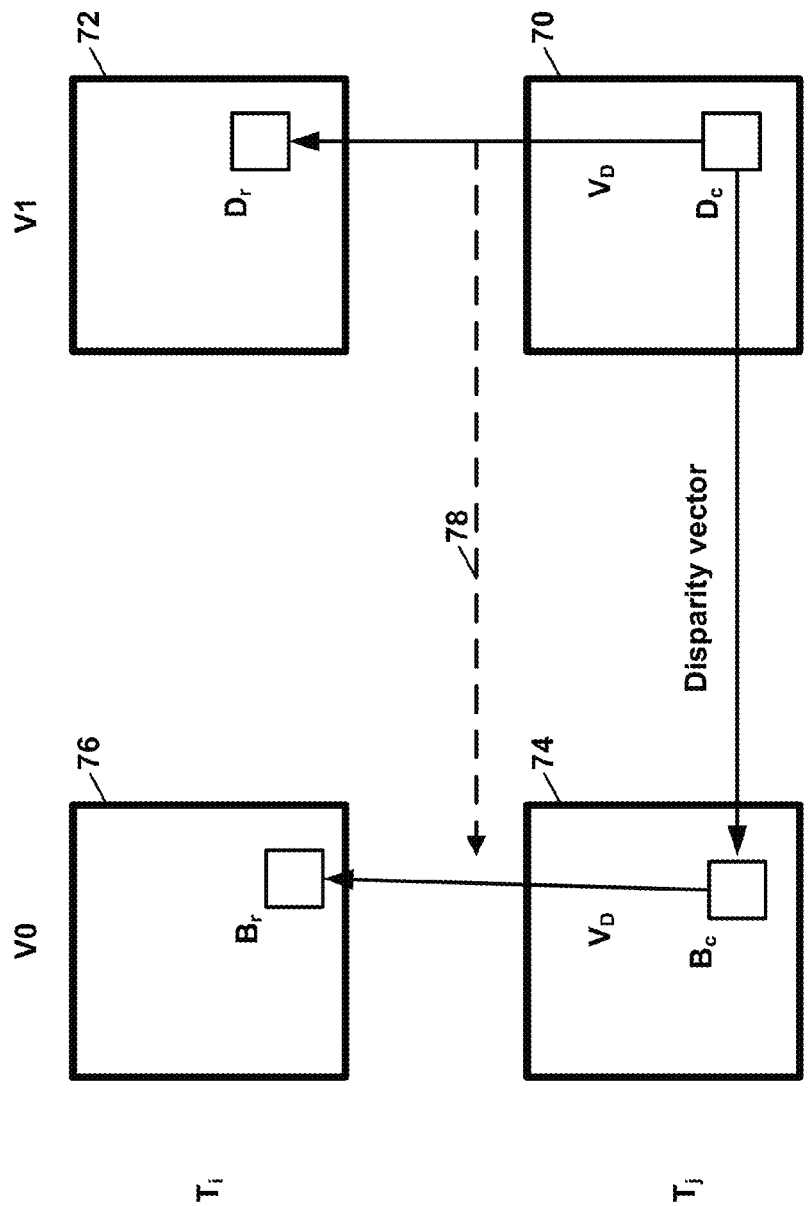
FIG. 4 is a conceptual diagram illustrating an example prediction structure of advanced residual prediction in multi-view and 3D video coding.

FIG. 4 is a conceptual diagram illustrating an example prediction structure of ARP in multi-view and 3D video coding. FIG. 4 includes four pictures: a current picture 70, a temporal reference picture 72, a disparity reference picture 74, and a temporal-disparity reference picture 76. Current picture 70 is associated with view V1 and is associated with time instance $T_j$. Temporal reference picture 72 is associated with view V1 and is associated with time instance $T_i$. Disparity reference picture 74 is associated with view V0 and is associated with time instance $T_j$. Temporal-disparity reference picture 76 is associated with view V0 and is associated with time instance $T_i$.

Current picture 70 includes a current PU denoted as "$D_c$." In other words, $D_c$ represents a current block in a current view (view 1). $D_c$ has a temporal motion vector $V_D$ that indicates a location in temporal reference picture 72. Video encoder 20 may determine a temporal reference block $D_r$ based on samples in picture 72 that are associated with the location indicated by the temporal motion vector $V_D$. Thus, $D_r$ denotes $D_c$'s temporal prediction block from the same view (view 1) at time $T_i$ and $V_D$ denotes the motion from $D_c$ to $D_r$.

Furthermore, video encoder 20 may determine a disparity reference block $B_c$ based on samples in disparity reference picture 74 that are associated with a location indicated by a disparity vector of $D_c$. Thus, $B_c$ denotes a reference block (i.e., the representation of $D_c$ in the reference view (view 0) at time $T_j$). The top-left position of $B_c$ can be calculated with the derived disparity vector by adding the derived disparity vector to the top-left position of $D_c$. Since $D_c$ and $B_c$ may be projections of the same object in two different views, $D_c$ and $B_c$ should share the same motion information. Therefore, $B_c$'s temporal prediction block $B_r$ in view 0 at time $T_i$ can be located from $B_c$ by applying the motion information of $V_D$.

Video encoder 20 may determine a temporal-disparity reference block $B_r$ (the predictive block of $B_c$) in temporal-disparity picture 76. As indicated above, temporal-disparity picture 76 is associated with the same view (i.e., view V0) as $B_r$ and is associated with the same time instance as $D_r$ (i.e., time instance $T_i$). Video encoder 20 may determine $B_r$ based on samples at a location indicated by the motion vector $V_D$ of $D_c$. Thus, the top-left position of $B_r$ can be calculated with the re-used motion vector $V_D$ by adding the motion vector $V_D$ to the top-left position of $B_c$. The top-left position of $B_c$ can be equal to the sum of the top-left position of $D_c$ and the disparity vector. Thus, the top-left position of $B_r$ may be equal to the sum of the coordinates of the top-left position of $D_c$, the disparity vector, and the motion vector $V_D$. In this way, as shown in FIG. 4 by arrow 78, video encoder 20 may re-use the motion vector $V_D$ for determining $B_r$.

Furthermore, in ARP, each sample in a first residual block may indicate the difference between a sample in $D_c$ and a corresponding sample of $D_r$. The first residual block may be referred to as an original residual block for $D_c$. Each sample in a second residual block may indicate a difference between a sample in $B_c$ and a corresponding sample in $B_r$. The second residual block may be referred to as a "residual predictor." Because video encoder 20 uses the motion vector $V_D$ to determine $B_r$, the residual predictor may be different than the actual residual data of $B_c$.

After video encoder 20 determines the residual predictor, video encoder 20 may multiply the residual predictor by a weighting factor. In other words, the residual of $B_c$ with motion information of $V_D$ is multiplied by a weighting factor and used as the residual predictor for the current residual. The weighting factor may be equal to 0, 0.5, or 1. Thus, three weighting factors may be used in ARP (i.e., 0, 0.5, and 1). After video encoder 20 multiplies the residual predictor by the weighting factor, the residual predictor may be referred to as a weighted residual predictor. Video encoder 20 may select, as a final weighting factor, the weighting factor that leads to a minimal rate-distortion cost for the current CU (i.e., the CU containing the current PU). Video encoder 20 may include, in the bitstream, at a CU level, data indicating a weighting index. The weighting index may indicate the final weighting factor (i.e., the weighting factor that was used to generate the weighted residual predictor) for the current CU. In some examples, weighting indexes of 0, 1, and 2 correspond to weighting factors of 0, 1, and 0.5, respectively. Selection of the weighting factor of 0 for the current CU is equivalent to not using ARP for any of the PUs of the current CU.

Video encoder 20 may then determine a final residual block for the current PU. Each sample in the final residual block for the current PU may indicate a difference between a sample in the original residual block and a corresponding sample in the weighted residual predictor. A residual block of a current CU (i.e., the CU containing the current PU) may include the final residual block for the current PU along with residual blocks, if any, for other PUs of the current CU. As described elsewhere in this disclosure, video encoder 20 may partition the residual block of the current CU among one or more transform blocks. Each of the transform blocks may be associated with a TU of the current CU. For each transform block, video encoder 20 may apply one or more transforms to the transform block to generate a transform coefficient block. Video encoder 20 may include, in a bitstream, data that represent quantized transform coefficients of the transform coefficient block.

Hence, in ARP, to ensure high correlation between residues of two views, video encoder 20 may apply motion of a current PU to a corresponding block in a reference view picture to generate a residual in the base view to be used for inter-view residual prediction. In this way, the motion is aligned for the current PU and the corresponding reference block in the reference view. Moreover, an adaptive weighting factor is applied to the residue signal so that the prediction error is further reduced.

If the current PU is bi-predicted, video encoder 20 may perform a similar process. For instance, video encoder 20 may use both the RefPicList0 and RefPicList1 motion vectors of the current PU to determine RefPicList0 and RefPicList1 temporal-disparity reference blocks. Video encoder 20 may determine a predictive block by interpolating samples of the RefPicList0 and RefPicList1 temporal-disparity reference block. Video encoder 20 may use this predictive block in the manner described above. Video decoder 30 may perform a similar process when performing ARP on a bi-predicted PU. For instance, video decoder 30 may determine the current PU's predictive block and the weighted residual predictor in the sample manner described above. Video decoder 30 may determine the current PU's final residual block based on elements signaled in the bitstream. Video decoder 30 may then reconstruct the current PU's prediction block by adding the current PU's final residual block, the current PU's predictive block, and the weighted residual predictor.

In some examples, the video coder may use the method of Neighboring Blocks Based Disparity Vector (NBDV) to derive a disparity vector for a block. 3D-HEVC first adopted the NBDV derivation process proposed in L. Zhang et al., "3D-CE5.h: Disparity vector generation results," Joint Collaborative Team on 3D Video Coding Extension Development of ITU-T SG 16 WP 3 and ISO/IEC JTC 1/SC 29/WG 11, $1^{st}$ Meeting: Stockholm, SE, 16-20 Jul. 2012, document JCT3V-A0097 (hereinafter, "JCT3V-A0097"). The NBDV derivation process has since been further adapted. For instance, implicit disparity vectors (IDVs) were included with a simplified NBDV in Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document JCT3V-A0126 (hereinafter, "JCT3V-A0126"). Furthermore, in Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0047 (hereinafter, "JCT3V-B0047"), the NBDV derivation process is further simplified by removing the IDVs stored in the decoded picture buffer, but also provides an improvement in terms of coding gain with the random access picture (RAP) picture selection.

The NBDV derivation process uses disparity motion vectors from spatial and temporal neighboring blocks to derive the disparity vector for the current block. Because neighboring blocks (e.g., blocks that spatially or temporally neighbor the current block) are likely to share almost the same motion and disparity information in video coding, the current block can use the motion vector information in the neighboring blocks as predictors of the disparity vector for the current block. In other words, because neighboring blocks share almost the same motion/disparity information in video coding, the current block can use the motion vector information in neighboring blocks as a good predictor to improve a coding gain. Following this idea, the NBDV derivation process uses the neighboring disparity information for estimating the disparity vector in different views.

When a video coder performs the NBDV derivation process to determine a disparity vector for a current block, the video coder may utilize two sets of neighboring blocks. One set is from spatially-neighboring blocks and the other set is from temporally-neighboring blocks. In other words, several spatial and temporal neighboring blocks are firstly defined. The video coder may then check each of the neighboring blocks in a pre-defined order determined by the priority of the correlation between the current block and the neighboring block. Once the video coder finds a disparity motion vector in the candidates (i.e., the neighboring blocks), the video coder may convert the disparity motion vector into the disparity vector for the current block.

In some versions of the NBDV derivation process, the video coder uses five spatial neighboring blocks for disparity vector derivation. For instance, the video coder may check the following spatially-neighboring blocks: the below-left spatially-neighboring block, the left spatially-neighboring block, the above-right spatially-neighboring block, the above spatially-neighboring block, and the above-left spatially-neighboring block of the current block. In some versions of the NBDV derivation process, the five spatially-neighboring blocks used for disparity vector derivation blocks may cover the locations $A_0$, $A_1$, $B_0$, $B_1$, and $B_2$, respectively, as indicated in FIG. 2. In some examples, the spatially-neighboring blocks used in the NBDV derivation process are the same as those used in the merge modes in HEVC. Therefore, in some such examples, no additional memory access is required.

In some examples, the video coder may check the spatial neighboring blocks one by one. Furthermore, in some examples, the checking order of the five spatial neighboring blocks is defined as $A_1$, $B_1$, $B_0$, $A_0$, and $B_2$.

Furthermore, as mentioned above, a video coder may check temporally-neighboring blocks as part of the process of determining a disparity vector for a current block (e.g., a current PU). When the video coder checks temporal neighboring blocks (e.g., temporal neighboring PUs), the video coder may first perform a construction process of a candidate picture list. When the video coder performs the construction process of the candidate picture list, the video coder may treat all reference pictures associated with the current view (i.e., the view associated with the current block) as candidate pictures. Furthermore, when the video coder performs the construction process of the candidate picture list, the video coder may first insert a so-called "co-located picture" into the candidate picture list, followed by the rest of the candidate pictures in ascending order of reference index. That is, the video coder may insert the remaining candidate pictures into the candidate picture list in accordance with the order that the remaining candidate pictures occur in reference picture lists (e.g., RefPicList0 and RefPicList1) of the current picture. One or more syntax elements in a slice header of a slice containing the current block may indicate the co-located picture. In some examples, when the reference pictures with the same reference index in both reference picture lists (e.g., RefPicList0 and RefPicList1) are available for use in the NBDV derivation process, the reference picture in the same reference picture list as the co-located picture precedes, in the candidate picture list, the other reference picture.

After generating the candidate picture list, the video coder may determine candidate regions within the candidate pictures in the candidate picture list. The video coder may use the candidate regions to determine temporally-neighboring blocks. As indicated above, the video coder may derive a disparity vector for the current block based on a disparity motion vector or an IDV of a temporally-neighboring block. In some examples, for each candidate picture in the candidate picture list, the video coder may determine three candidate regions for deriving temporally-neighboring blocks. The three candidate regions may be defined as follows:

CPU: A co-located region of the current PU or current CU.
CLCU: A largest coding unit (LCU) covering the co-located region of the current PU.
BR: A bottom-right 4×4 block of the CPU.

Because smaller blocks in a 16×16 block may share the same motion information as a result of motion compression, the video coder may check only one sample block for a disparity vector. When a candidate region covers more than one 16×16 block, the video coder may check all 16×16 blocks in the candidate region according to a raster scan order. For instance, a motion vector for a temporally co-located block is stored in a 16×16 block of a reference picture, and, typically, the video coder accesses a 4×4 block to find a motion vector. Thus, in some examples, if the video coder places the candidate block in a 16×16 block, all the 4×4 blocks contain a common motion vector and the video coder does not need to check all the 4×4 blocks to find a different motion vector. On the other hand, if the candidate region is larger than 16×16, the 4×4 blocks outside the 16×16 block may contain a different motion vector.

When the video coder checks a candidate region (or a 16×16 block within a candidate region), the video coder may determine whether a PU that covers the candidate region specifies a disparity motion vector. If the PU that covers the candidate region specifies a disparity motion vector, the video coder may determine the disparity vector for the current block based on the disparity motion vector of the PU.

In some examples, the video coder may perform a priority-based disparity vector determination as part of performing an NBDV derivation process. For example, the video coder may derive the disparity vector such that once the video coder identifies a neighboring block that contains a disparity motion vector, the video coder converts the disparity motion vector to the disparity vector for the current block. The video coder may then use the disparity vector for inter-view motion prediction and/or inter-view residual prediction. In some examples, the checking order of neighboring blocks is defined based on the correlation between the neighboring blocks and the current block. For instance, the video coder may firstly check spatial neighboring blocks one by one. Once the video coder has identified a disparity motion vector, the video coder returns the disparity motion vector as the disparity vector. In some examples, the checking order of the five spatial neighboring blocks is defined as $A_1$, $B_1$, $B_0$, $A_0$ and $B_2$.

Furthermore, for each candidate picture in the candidate picture list, the video coder may check three candidate regions in this candidate picture in order. The checking order of the three regions is defined as: CPU, CLCU and BR for the first non-base view or BR, CPU, CLU for the second non-base view. In this example, decoding of pictures associated with the first non-base view may depend on decoding of pictures associated with a base view, but not pictures associated with other views. Furthermore, in this example, decoding of pictures associated with the second non-base view may depend on decoding of pictures associated with the base view and, in some instances, the first non-base view, but not pictures associated with other views, if present. For simplicity, the disparity motion vectors in the spatial neighboring blocks may be denoted as spatial disparity vectors (SDVs) and the disparity motion vectors in the temporal neighboring blocks may be denoted as temporal disparity vectors (TDVs).

When the video coder checks the motion vector(s) of a block (i.e., a spatially-neighboring block, a candidate region of a candidate picture, or a 16×16 block of a candidate region of a candidate picture), the video coder may determine whether the motion vector(s) of the block are disparity motion vectors. A disparity motion vector of a block of a picture is a motion vector pointing to a location within a disparity reference picture of the picture. A disparity reference picture (also referred to herein as an inter-view reference picture) of a given picture may be a picture that is associated with the same access unit as the given picture, but is associated with a different view than the given picture. When the video coder identifies a disparity motion vector, the video coder may terminate the checking process. The video coder may convert the returned disparity motion vector to a disparity vector and may use the disparity vector for inter-view motion prediction and inter-view residual prediction. For example, the video coder may set a horizontal component of the disparity vector for the current block equal to a horizontal component of the disparity motion vector and may set the vertical component of the disparity vector to 0. In another example, the video coder may convert the disparity motion vector to a disparity vector by setting the disparity vector equal to the disparity motion vector.

When the video coder checks a spatially-neighboring block (e.g., a spatially-neighboring PU), the video coder may first check whether the spatially-neighboring block has a disparity motion vector. If none of the spatially-neighboring blocks has a disparity motion vector, the video coder may determine whether any of the spatially-neighboring blocks has an IDV. Furthermore, when the video coder identifies a disparity motion vector or an IDV, the video coder may return the identified disparity motion vector or IDV. The term "implicit disparity vector" may refer to a disparity vector that was used for inter-view motion prediction or inter-view residual prediction. Even though the corresponding block may be coded with temporal motion prediction, the video coder does not discard the derived disparity vector for the purpose of coding one or more following blocks. In this way, an IDV may be stored to the block for the purpose of disparity vector derivation.

When the video coder determines whether any of the spatially-neighboring PUs has an IDV, the video coder may check the spatially-neighboring PUs in the order of $A_0$, $A_1$, $B_0$, $B_1$, and $B_2$. Thus, the video coder may check the spatially-neighboring PUs in the order of $A_1$, $B_1$, $B_0$, $A_0$ and $B_2$ for disparity motion vectors and check the spatially-neighboring PUs in the order of $A_0$, $A_1$ $B_0$, $B_1$, and $B_2$ for IDVs. If one of the spatially-neighboring PUs has an IDV and the IDV is coded as merge/skip mode, the video coder may terminate the checking process and may use the IDV as the final disparity vector for the current block.

If the video coder is unable to derive a disparity vector for the current block (i.e., if no disparity vector is found) by performing the NBDV derivation process, the video coder may use a zero disparity vector as the disparity vector for the current block. The zero disparity vector is a disparity vector having both horizontal and vertical components equal to 0. Thus, even when the NBDV derivation process returns an unavailable result, other coding processes of the video coder that require a disparity vector may use a zero disparity vector for the current block. In some examples, if the video coder is unable to derive a disparity vector for the current block by performing the NBDV derivation process, the video coder may disable inter-view residual prediction for the current block. However, regardless of whether the video coder is able to derive a disparity vector for the current block by performing the NBDV derivation process, the video coder may use inter-view motion prediction for the current PU. That is, if no disparity vector is found after checking all the pre-defined neighboring blocks, a zero disparity vector may be used for inter-view motion prediction while inter-view residual prediction may be disabled for the corresponding CU.

In some examples where the video coder checks IDVs as part of the NBDV derivation process, the video coder may perform the following steps, although additional steps may also be used in other examples. If any of the following steps find a disparity vector, the video coder may terminate the derivation process.

Step 1: Check the five spatial neighboring blocks in the order of $A_1$, $B_1$, $B_0$, $A_0$ and $B_2$ to find a disparity motion vector. Once the video coder finds a disparity motion vector, the video coder converts the disparity motion vector to a disparity vector. If the spatial neighboring blocks contain IDVs, the video coder marks their IDV flags as "IDV used" and stores the associated values of the IDV flags.

Step 2: When temporal motion vector prediction is enabled, the following applies:
  a) If the current coding mode is AMVP, the reference picture with the target reference index in a target reference picture list is used as the co-located picture. Two blocks in the co-located picture are defined (i.e., the bottom right block of the co-located PU (BR) and the center block of the co-located PU (CB)). In this example, the video coder checks the blocks of the co-located picture in the following order:
    1) Check BR to see whether BR contains a disparity motion vector. If yes, the video coder converts the disparity motion vector to a disparity vector. Otherwise, if BR is coded as the skip mode and BR contains an IDV (i.e., the flag of IDV is equal to 1), the video coder marks BR as "IDV used" and stores the associated IDV. The video coder may then perform Step 3 below.
    2) Check CB to see whether CB contains a disparity motion vector. If yes, the video coder converts the disparity motion vector to a disparity vector. Otherwise, if BR is coded as the skip mode and BR contains an IDV (i.e., the flag of IDV is equal to 1), the video coder marks BR as "IDV used" and the video coder stores the associated IDV. The video coder may then perform Step 3.
  b) If the current coding mode is skip/merge, the video coder uses two co-located reference pictures in each reference picture list, if applicable. The reference indexes that indicate the co-located reference pictures may be equal to the reference index of the left neighboring PU or 0. For each of the co-located pictures in the reference picture lists 0 and 1, the video coder performs the steps in Step 2, a) 1) and a) 2) in order.

Step 3: If one of the five spatial neighboring blocks is coded as a skip mode and the spatial neighboring block contains an IDV (i.e., the spatial neighboring block has a flag marked as "IDV used"), the video coder returns the IDV as a disparity vector. In this example, the checking order of spatial neighboring blocks for IDVs is $A_0$, $A_1$, $B_0$, $B_1$, and $B_2$.

Step 4: If temporal motion vector prediction is enabled and there is one block in the co-located picture (i.e., BR or CB) that is marked as "IDV used," the video coder converts the IDV associated with the block to a disparity vector. In some examples, the video coder may convert the IDV to a disparity vector by setting a horizontal component of the IDV equal to a horizontal component of the disparity vector and setting a vertical component of the disparity vector equal to 0. In other examples, the video coder may convert the IDV to a disparity vector by setting the disparity vector equal to the IDV.

The memory bandwidth and complexity requirements associated with accessing an IDV in a decoded picture buffer (DPB) may be large. For instance, the video coder may need to perform several memory accesses to store and retrieve IDVs from the DPB. Accordingly, a video coder may perform a low-complexity NBDV derivation process. The video coder considers fewer block candidates when the video coder performs the low complexity NBDV derivation process. For example, the video coder may store, in the DPB, information for IDVs. In this example, the information for IDVs may include IDV flags and vectors for all the previously-coded pictures. Furthermore, in a low complexity NBDV derivation process, removing the IDV candidates in the DPB can reduce the memory bandwidth. In other words, the video coder does not store IDV-related information in the DPB.

Figure 5:
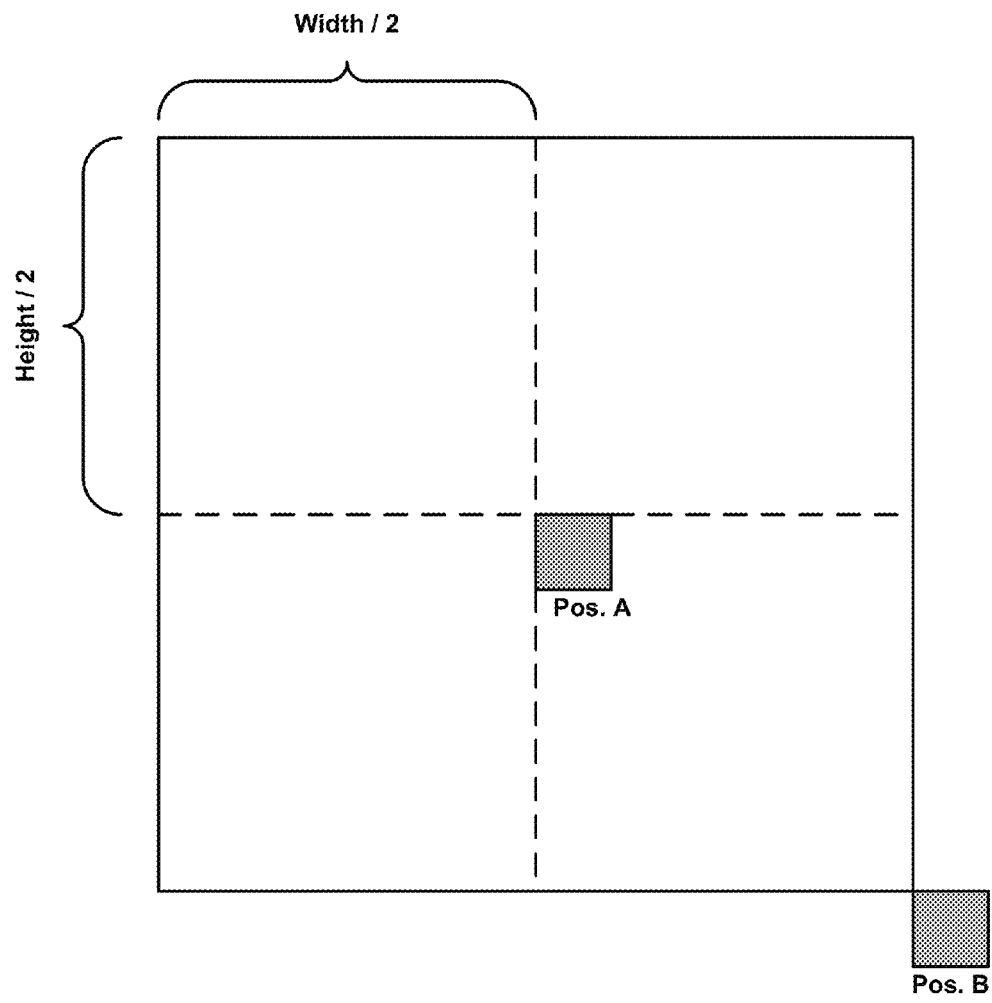
FIG. 5 is a conceptual diagram illustrating temporal neighbors in a corresponding PU of a temporal candidate picture.

In some low-complexity NBDV derivation processes, the video coder checks fewer candidate regions of candidate pictures than in the NBDV derivation process described above. For example, FIG. 5 is a conceptual diagram illustrating temporal neighbors in a corresponding PU of a temporal candidate picture. In the example of FIG. 5, the video coder may check candidate regions covering this positions indicated by "Pos. A" and "Pos. B." Furthermore, in some low-complexity NBDV derivation processes, the video coder may check candidate regions of only a co-located picture and a random access picture. Thus, in some examples, a co-located picture and a random access picture are considered for temporal block checks (i.e., bottom-below and center blocks as shown in FIG. 5). In HEVC and other video coding specifications, random access refers to a decoding of a bitstream starting from a coded picture that is not the first coded picture in the bitstream. Example types of random access pictures include IDR pictures, CRA pictures, and BLA pictures.

Furthermore, in some low-complexity NBDV derivation processes, the video coder may perform the candidate picture derivation in a slice or picture level once. In other words, the video coder may generate the candidate picture list for use in the NBDV derivation process once per picture or slice. Consequently, in such low-complexity NBDV derivation processes, the video coder no longer invokes the candidate picture derivation process at the PU or CU level.

Each coded picture may have a reference picture set that includes all the pictures that may be used for reference by either the coded picture or the picture following (i.e., in the future) the coded picture. A video coder may distinguish which pictures can only be used as a reference of a future picture. Reference picture lists may be constructed based on the pictures in the reference picture set ("RPS") that can be used for the current picture (namely "RPS for current") thus not the pictures that can only be used as references of future pictures. A picture in the future RPS may not be in any of the two reference picture lists, RefPicList0 or RefPicList1.

In some examples, when video encoder 20 begins encoding a current picture, video encoder 20 may generate five subsets of reference pictures (i.e., reference picture subsets) for the current picture. In some examples, these five reference picture subsets are: RefPicSetStCurrBefore, RefPicSetStCurrAfter, RefPicSetStFoll, RefPicSetLtCurr, and RefPicSetLtFoll. This disclosure may refer to the reference pictures in RefPicSetStCurrBefore, RefPicSetStCurrAfter, RefPicSetStFoll as "short-term reference pictures," "short-term pictures," or "STRPs." Thus, a "short-term reference picture" may be a picture that is marked (e.g., by virtue of being in RefPicSetStCurrBefore, RefPicSetStCurrAfter, or RefPicSetStFoll) as being used for short-term reference. This disclosure may refer to the reference pictures in RefPicSetLtCurr and RefPicSetLtFoll as "long-term reference pictures," "long-term pictures," or "LTRPs." Video encoder 20 may re-generate the five reference picture subsets for each picture.

Furthermore, when a current picture comprises P slices (i.e., slices in which intra prediction and uni-directional inter prediction are enabled), video encoder 20 may use the reference pictures from the RefPicStCurrAfter, RefPicStCurrBefore, and RefPicStLtCurr reference picture subsets of the current picture to generate a single reference picture list (RefPicList0) for the current picture. When the current picture comprises B slices (i.e., slices in which intra prediction, uni-directional inter prediction, and bi-directional inter prediction are enabled), video encoder 20 may use the reference pictures from the RefPicStCurrAfter, RefPicStCurrBefore, and RefPicStLtCurr reference picture subsets of the current picture to generate two reference picture lists (RefPicList0 and RefPicList1) for the current picture. Video encoder 20 may include, in a slice header for a first slice of the current picture, syntax elements that video decoder 30 may use to determine the reference picture subsets of the current picture. When video decoder 30 decodes a current slice of the current picture, video decoder 30 may determine the reference picture subsets of the current picture and may regenerate RefPicList0 and/or RefPicList1.

As indicated above, when a video coder begins coding a current picture, the video coder may initialize a first reference picture list (i.e., RefPicList0) for the current picture. Furthermore, if the current picture comprises B slices, the video coder may initialize a second reference picture list (i.e., RefPicList1) for the current picture. Hence, in some examples, a video coder may generate RefPicList1 only if a current view component/layer representation includes a B slice (i.e., a bi-prediction slice). In some examples, reference picture list initialization is an explicit mechanism that puts reference pictures in a reference picture memory (i.e., a decoded picture buffer) into a list based on the order of picture order count (POC) values of the reference pictures. A POC value is a variable that is associated with each picture that indicates the position of the associated picture in output order relative to the output order positions of the other pictures in the same coded video sequence.

To generate RefPicList0, a video coder (e.g., a video encoder or a video decoder) may generate an initial, default version of RefPicList0. In some examples, in the initial version of RefPicList0, reference pictures in RefPicSetStCurrBefore are listed first, followed by reference pictures in RefPicSetStCurrAfter, followed by reference pictures in RefPicSetLtCurr. Similarly, to generate RefPicList1, the video coder may generate an initial version of RefPicList1. In some examples, in the initial version of RefPicList1, reference pictures in RefPicSetStCurrAfter are listed first, followed by reference pictures in RefPictSetStCurrBefore, followed by reference pictures in RefPicSetLtCurr.

In some examples, the video coder constructs a combined list (e.g., RefPicListC) for a B slice after the video coder has constructed the final reference picture lists (i.e., RefPicList0 and RefPicList1). The video coder may further modify the combined list further if one or more reference picture list modification syntax elements are present for the combined list.

After a video coder has initialized a reference picture list (e.g., RefPicList0 or RefPicList1), the video coder may modify the order of the reference pictures in the reference picture list. In other words, the video coder may perform a reference picture list modification (RPLM) process. The video coder may modify the order of the reference pictures in any order, including the case where one particular reference picture may appear at more than one position in the reference picture list. Hence, the reference picture list reordering mechanism can modify the position of a picture that was put in the list during the reference picture list initialization to any new position, or put any reference picture in the reference picture memory in any position, even if the picture does not belong in the initialized list. However, if a position of a picture exceeds the number of active reference pictures of the list, the picture is not considered as an entry of the final reference picture list. A slice header may include one or more syntax elements that indicate the number of active reference pictures in the reference picture lists.

To implement the RPLM process, a slice header may include an RPLM syntax structure (e.g., ref_pic_list_modification( )). Table 1, below, shows the RPLM syntax structure presented in HEVC Working Draft 8.

TABLE 1

| ref_pic_list_modification( ) { | Descriptor |
|---|---|
|   ref_pic_list_modification_flag_l0 | u(1) |
|   if( ref_pic_list_modification_flag_l0 && NumPocTotalCurr > 1 ) | |
|     for( i = 0; i <= num_ref_idx_l0_active_minus1; i++ ) | |
|       list_entry_l0[ i ] | u(v) |
|   if( slice_type = = B ) { | |
|     ref_pic_list_modification_flag_l1 | u(1) |
|     if( ref_pic_list_modification_flag_l1 && NumPocTotalCurr > 1 ) | |
|       for( i = 0; i <= num_ref_idx_l1_active_minus1; i++ ) | |
|         list_entry_l1[ i ] | u(v) |
|   } | |
| } | |

In the example of Table 1, above, and other syntax tables of this disclosure, syntax elements having descriptors of the form u(n), where n is a non-negative integer, are unsigned values of length n. Furthermore, syntax elements having descriptors of the form u(v) are unsigned variable length values. Furthermore, with regard to Table 1, the variable NumPocTotalCurr is set equal to NumPocStCurrBefore+NumPocStCurrAfter+NumPocLtCurr. NumPocStCurrBefore indicates the number of elements in RefPicSetStBefore. NumPocStCurrAfter indicates the number of elements in RefPicSetStAfter. NumPocLtCurr indicates the number of elements in RefPicSetLtCurr.

In Table 1, the ref_pic_list_modification_flag_l0 syntax element equal to 1 indicates that RefPicList0 is specified explicitly as a list of list_entry_l0[i] values. The ref_pic_list_modification_flag_l0 syntax element equal to 0 indicates that RefPicList0 is determined implicitly. The ref_pic_list_modification_flag_l1 syntax element equal to 1 indicates that RefPicList1 is specified explicitly as a list of list_entry_l1[i] values. The ref_pic_list_modification_flag_l1 syntax element equal to 0 indicates that RefPicList1 is determined implicitly.

Furthermore, in the example of Table 1, the list_entry_lX[i] syntax element (with X being equal to 0 or 1) specifies the index of the reference picture in RefPicSetCurrTempListX to be placed at the current position of reference picture list LX (with X being equal to 0 or 1). RefPicSetCurrTempListX (which is also referred to as RefPicListTempX) is the initial version of RefPicListX. The value of X is the same for each of list_entry_lX, RefPicSetCurrTempListX, and LX. In this example, the length of the list_entry_lX[i] syntax element is Ceil(Log 2(NumPocTotalCurr)) bits. Furthermore, in this example, the value of list_entry_lX[i] is in the range of 0 to NumPocTotalCurr−1, inclusive. If the list_entry_lX[i] syntax element is not present, the list_entry_lX[i] syntax element may be inferred to be equal to 0.

As indicated above, the video coder may generate an initial version of RefPicList0 when the video coder begins coding a P or B slice. The initial version of RefPicList0 may be denoted RefPicListTemp0. In HEVC Working Draft 8, the video coder may use an operation described by the following pseudo-code to generate the initial version of RefPicList0.

```
rIdx = 0
while( rIdx < NumRpsCurrTempList0 ) {
    for( i = 0; i < NumPocStCurrBefore && rIdx < NumRpsCurrTempList0; rIdx++, i++ )
        RefPicListTemp0[ rIdx ] = RefPicSetStCurrBefore[ i ]
    for( i = 0; i < NumPocStCurrAfter && rIdx < NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0; rIdx++, i++)
        RefPicListTemp0[ rIdx ] = RefPicSetLtCurr[ i ]
}
```

In the pseudo-code above, the variable NumRpsCurrTempList0 is set equal to Max(num_ref_idx_l0_active_minus1+1, NumPocTotalCurr). The variable num_ref_idx_l0_active_minus1 indicates the number of active reference pictures in RefPicList0 minus 1.

Furthermore, in HEVC Working Draft 8, RefPicList0 is constructed as follows:

```
for( rIdx = 0; rIdx ≤ num_ref_idx_l0_active_minus1; rIdx++)
    RefPicList0[ rIdx ] =
    ref_pic_list_modification_flag_l0 ?
        RefPicListTemp0[ list_entry_l0[ rIdx ] ] :
RefPicListTemp0[ rIdx ]
```

In the pseudo-code above, if reference picture list modification is enabled for RefPicList0, the video coder may, for each respective position in RefPicList0, determine a list_entry_l0 syntax element corresponding to the respective position in RefPicList0. The video coder may insert, at the respective position in RefPicList0, a reference picture at a position in RefPicListTemp0 indicated by the determined list_entry_l0 syntax element.

Furthermore, the video coder may generate an initial version of RefPicList1 when the video coder begins coding a B slice. The initial version of RefPicList1 may be denoted RefPicListTemp1. In HEVC Working Draft 8, the video coder may use an operation described by the following pseudo-code to generate the initial version of RefPicList1.

```
rIdx = 0
while( rIdx < NumRpsCurrTempList1 ) {
    for( i = 0; i < NumPocStCurrAfter && rIdx < NumRpsCurrTempList1;
rIdx++, i++ )
        RefPicListTemp1[ rIdx ] = RefPicSetStCurrAfter[ i ]
    for( i = 0; i < NumPocStCurrBefore && rIdx <
NumRpsCurrTempList1; rIdx++, i++ )
        RefPicListTemp1[ rIdx ] = RefPicSetStCurrBefore[ i ]
    for( i = 0; i < NumPocLtCurr && rIdx <
NumRpsCurrTempList1; rIdx++, i++)
        RefPicListTemp1[ rIdx ] = RefPicSetLtCurr[ i ]
}
```

In the pseudo-code above, the variable NumRpsCurrTempList1 is set equal to Max(num_ref_idx_l1_active_minus1+ 1, NumPocTotalCurr). The variable num_ref_idx_l1_active_minus1 indicates the number of active reference pictures in RefPicList1 minus 1.

Furthermore, in HEVC Working Draft 8, RefPicList1 is constructed as follows:

```
for( rIdx = 0; rIdx ≤ num_ref_idx_l1_active_minus1; rIdx++)
    RefPicList1[ rIdx ] =
        ref_pic_list_modification_flag_l1 ?
            RefPicListTemp1[ list_entry_l1[ rIdx ] ] :
            RefPicListTemp1[ rIdx ]
]
```

In the pseudo-code above, if reference picture list modification is enabled for RefPicList1, the video coder may, for each respective position in RefPicList1, determine a list_entry_l1 syntax element corresponding to the respective position in RefPicList1. The video coder may insert, at the respective position in RefPicList1, a reference picture at a position in RefPicListTemp1 indicated by the determined list_entry_l1 syntax element.

In some codec extensions of particular video coding standards (e.g., HEVC), a reference picture list may contain normal temporal reference pictures as well as reference pictures from, or generated from pictures from, views/layers other than a current view/layer. Reference pictures from, or generated from pictures from, other views/layer are named "inter-view/layer reference pictures." The process of generating the reference pictures from pictures from other views/layers may be referred to as view synthesis prediction and pictures generated in this way may be referred to as view synthesis pictures.

In HEVC, both reference picture lists (i.e., refPicList0 and refPicList1) typically include temporal reference pictures. However, in some extensions of HEVC (e.g., 3D-HEVC), inter-view/layer reference pictures typically are only present in RefPicList0 and are typically never in RefPicList1. Furthermore, in 3D-HEVC, a reference picture list may contain inter-view/layer reference pictures and ref_layer_id[i][j] syntax elements in a VPS extension may signal the views/layers that a video coder can use to predict a specific view/layer, as shown in Table 2 below.

TABLE 2

| vps_extension( ) { | Descriptor |
|---|---|
| while( !byte_aligned( ) ) | |
| ... | |
| view_id[ i ] | u(8) |
| if ( i > 0 ) | |
| num_direct_ref_layers[ i ] | u(6) |
| for( j = 0; j < num_direct_ref_layers[ i ]; j++ ) | |

TABLE 2-continued

| vps_extension( ) { | Descriptor |
|---|---|
| ref_layer_id[ i ][ j ] | u(6) |
| } | |
| ... | |
| } | |

In the example of Table 2, the video coder inserts each inter-view/layer reference picture identified by ref_layer_id[i][j] in the same access unit into a so-called inter-view/layer RPS. The video coder may use reference pictures in the inter-view/layer RPS to initialize RefPicList0 and/or RefPicList1. After initializing RefPicList0 and/or RefPicList1, the video coder may modify the order of reference pictures in RefPicList0 and/or RefPicList1. In other words, the inter-view/layer RPS may be further considered for reference picture list initialization and modification for both RefPicList0 and RefPicList1.

Ramasubramonian et al., "AHG7: Reference picture list initialization for MV-HEVC," Joint Collaborative Team on 3D Video Coding Extension Development of ITU-T SG 16 WP 3 and ISO/IEC JTC 1/SC 29/WG 11, $3^{rd}$ meeting, Geneva, CH, 17-23 Jan. 2013, document JCT3V-C0060 (hereinafter, JCT3V-C0060) proposes a reference picture list initialization method to put the inter-view reference pictures consecutively into a given place of a reference picture list. Specifically, JCT3V-C0060 proposes a method of initialization of reference picture lists for MV-HEVC where a desired initial position of the inter-view reference pictures is signaled in a slice header. Furthermore, in JCT3V-C0060, the initialization process of the reference picture lists is modified so that the inter-view reference pictures are present in the signaled starting position in the initial reference picture list.

Table 3, below, is an example portion of the syntax for a slice header as defined in JCT3V-C0060. The underlined text in Table 3 indicates text added the slice header syntax defined in MV-HEVC Working Draft 2.

TABLE 3

| slice_header( ) { | Descriptor |
|---|---|
| first_slice_in_pic_flag | u(1) |
| ... | |
| if( slice_header_extension_present_flag ) { // should always be true in MV-HEVC | |
| slice_header_extension_length | ue(v) |
| if( slice_type != I_SLICE ) | |
| <u>inter_view_ref_start_position_plus1</u> | <u>ue(v)</u> |
| ... | |
| } | |
| byte_alignment( ) | |
| } | |

In the example of Table 3, above, and other syntax tables of this disclosure, syntax elements with type descriptor ue(v) may be variable-length unsigned integers encoded using $0^{th}$ order exponential Golomb (Exp-Golomb) coding with left bit first. As indicated in Table 3, a slice header of a slice may include an inter_view_ref_start_position_plus1 syntax element if the slice is not an I slice (i.e., an intra coded slice).

Furthermore, JCT3V-C0060 indicates that the inter_view_ref_start_position_plus1 syntax element specifies the starting position of the inter-view reference pictures in reference picture list 0 after reference picture list initialization. The inter_view_ref_start_position_plus1 syntax element is in the range of 0 to min (num_ref_idx_l0_active_minus1+1, NumPocStCurrBefore+NumPocStCurrAfter+NumPocLtCurr), inclusive. When the inter_view_ref_start_position_plus1 syntax element is equal to zero, the inter-view reference pictures are present in the default position in the reference picture list. For other non-zero values, the inter_view_ref_start_position_plus1 syntax element minus 1 denotes the starting position of inter-view reference pictures in the initial reference picture list. When not present, the inter_view_ref_start_position_plus1 syntax element may be inferred to be the default value, which equals to NumPocStCurrBefore+NumPocStCurrAfter+NumPocLtCurr+1.

JCT3V-C0060 indicates that a variable IvRefStartPos is derived as follows.

```
if( !inter_view_ref_start_position_plus1 )
    IvRefStartPos = NumPocStCurrBefore + NumPocStCurrAfter +
NumPocLtCurr
else
    IvRefStartPos = inter_view_ref_start_position_plus1 − 1
```

Furthermore, JCT3V-C0060 proposes the following changes to the decoding process of MV-HEVC Working Draft 2. In the following, underlined text is added to MV-HEVC Working Draft 2 and italicized text in double square brackets is removed from MV-HEVC Working Draft 2.

The variable NumRpsCurrTempList0 is set equal to Max (num_ref_idx_l0_active_minus1+1, NumPocTotalCurr) and the list RefPicListTemp0 is constructed as follows:

```
cIdx = 0
while( cIdx < NumRpsCurrTempList0 ) {
    for( i = 0; i < NumPocStCurrBefore && cIdx <
NumRpsCurrTempList0; cIdx++, i++ )
        RefPicListTemp0[ cIdx ] = RefPicSetStCurrBefore[ i ]
    for( i = 0; i < NumPocStCurrAfter && cIdx < NumRpsCurrTempList0;
cIdx++, i++ ) (F-25)
        RefPicListTemp0[ cIdx ] = RefPicSetStCurrAfter[ i ]
    for( i = 0; i < NumPocLtCurr && cIdx < NumRpsCurrTempList0;
cIdx++, i++ )
        RefPicListTemp0[ cIdx ] = RefPicSetLtCurr[ i ]
    [[ for( i = 0; i < NumIvCurr && rIdx < NumRpsCurrTempList0; rIdx++,
i++
)
        RefPicListTemp0[ rIdx ] = RefPicSetIvCurr[ i ]]]
}
// Shift the pictures in the list to create space for inter-view reference
pictures, if necessary
for( cIdx = NumRpsCurrTempList0 − 1; cIdx >= IvRefStartPos +
NumPocIvCurr; cIdx −− )
        RefPicListTemp0[ cIdx ] = RefPicListTemp0[ cIdx −
        NumPocIvCurr ]
// Include the inter-view reference pictures
for( i=0, cIdx = IvRefStartPos; i < NumPocIvCurr; cIdx++, i++ )
        RefPicListTemp0[ cIdx] = RefPicSetIvCurr[ i]
```

The list RefPicList0 is constructed as follows:

```
for( cIdx = 0; cIdX ≤ num_ref_idx_l0_active_minus1; cIdx++)
        (F-26)
        RefPicList0[cIdx] = ref_pic_list_modification_flag_l0 ?
        RefPicListTemp0[list_entry_l0[cIdx] ] : RefPicListTemp0[ cIdx ]
```

JCT3V-C00060 indicates that the derivation of RefPicList1 is the same as defined in the MV-HEVC Working Draft 2. Accordingly, the method of JCT3V-C0060 may not help to reduce complexity for RefPicList1 but may only help to reduce complexity for RefPicList0.

Some tools in some HEVC extensions, such as MV-HEVC, 3D-HEVC and SHVC, assume that inter-view/layer reference pictures are present in both RefPicList0 and RefPicList1. This may lead to several issues. For example, all low-level coding tools that need to access information related to the assumption that an inter-view prediction may be present in RefPicList1 need to perform redundant checks, which may lead to more operations and may also require more data to be stored in memory. For instance, low level coding tools (e.g., coding tools applied at a PU level or a CU level) may continue to check whether reference pictures in RefPicList1 are inter-view/layer reference pictures, regardless of whether RefPicList1 includes any inter-view/layer reference pictures.

In another example, reference picture list construction processes are processes related to reference picture list construction (including reference picture list initialization and reference picture list modification). In this example, the reference picture list construction processes may assume that RefPicList1 includes inter-view/layer reference pictures. Thus, in this example, the reference picture list construction processes may need more processes and redundant syntax that is present in RefPicList0 and RefPicList1, while such processes and syntax may be useless for RefPicList1.

In another example issue that may arise because certain coding tools assume that inter-view/layer reference pictures are present in both RefPicList0 and RefPicList1, syntax elements present in syntax tables related to reference picture list construction (e.g., list_entry_l0 syntax elements and list_entry_l1 syntax elements) may be u(v) coded. As a result, the syntax elements corresponding to RefPicList1 may be unnecessarily long. In another example, inserting the same inter-view/layer reference picture into both RefPicList0 and RefPicList1 may not result in any coding gain.

Examples of this disclosure include a multi-view/3D or scalable codec configured to disable inter-view/layer prediction in high level syntax structures. High level syntax structures may include syntax structures in non-VCL NAL units. For instance, high level syntax structures may include SEI messages, parameter sets (e.g., VPSs, SPSs, PPSs, etc.), and so on.

In one example of this disclosure, video encoder 20 signals a syntax element (e.g., inter_view_l1_disable_flag) in a VPS extension. For ease of explanation, this disclosure may refer to this syntax element as the inter_view_l1_disable_flag, even though this syntax element may have a different name in an applicable codec. The inter_view_l1_disable_flag indicates whether inter-view/layer reference pictures are ever included in the RefPicList1 for any view component/layer representation of a CVS that refers to the VPS.

In another example, video encoder 20 may signal the inter_view_l1_disable_flag for each layer in order to indicate whether inter-view/layer reference pictures are ever included in the RefPicList1 for any view component/layer representation of a specific view/layer of the CVS that refers to the VPS. In this example, multiple such syntax elements (e.g., flags) may be signaled in VPS, each is attached to one specific layer/view. For instance, in this example, video encoder 20 may signal separate SPSs for different CVSs in different layers. Each SPS may include an inter_view_l1_disable flag that indicates whether the RefPicList1's for pictures that refer to the SPS ever include inter-view reference pictures/layer representations. Hence, in this example, video decoder 30 may obtain, from SPSs, syntax elements that indicate, for each respective layer in a plurality of layers, a respective syntax element for the respective layer that indicates whether inter-view/layer reference pictures are ever included in respective reference picture lists of view components/layer representations in the respective layer.

For ease of explanation, this disclosure assumes that the inter_view_l1_disable_flag having a value of 1 indicates that RefPicList1's to which the inter_view_l1_disable_flag is applicable never include inter-view/layer reference pictures. Furthermore, for ease of explanation, this disclosure assumes that the inter_view_l1_disable_flag having a value of 0 indicates that RefPicList1's to which the inter_view_l1_disable Flag is applicable may include inter-view/layer reference pictures. However, in other examples, the inter_view_l1_disable_flag having a value of 0 indicates that RefPicList1's to which the inter_view_l1_disable_flag is applicable never include inter-view/layer reference pictures and the inter_view_l1_disable_flag having a value of 1 indicates that RefPicList1's to which the inter_view_l1_disable_flag is applicable may include inter-view/layer reference pictures.

When the inter_view_l1_disable_flag is 1, the video decoding process performed by video decoder 30 may be simplified in various ways. Such simplifications may accelerate the decoding process, in part by reducing the number of operations performed in the decoding process and/or reducing the number of memory accesses performed during the decoding process.

In one example of how the decoding process may be simplified when the inter_view_l1_disable_flag is 1, when video decoder 30 performs an NBDV derivation process to determine a disparity vector for a current block and the inter_view_l1_disable_flag is 1, video decoder 30 does not check RefPicList1 motion information of neighboring blocks. In other words, in disparity vector derivation of 3D-HEVC (NBDV), the motion information corresponding to RefPicList1 (e.g., a RefPicList1 motion vector, a RefPicList1 reference index, etc.) is never checked, thus the complexity can be decreased by a factor of 2 in this configuration. Furthermore, in this example or other examples, when video decoder 30 performs the NBDV derivation process and the inter_view_l1_disable_flag is 1, video decoder 30 does not store an IDV for a neighboring block when the neighboring block does not have a RefPicList0 disparity motion vector or a RefPicList0 IDV. Thus, video decoder 30 may store at most one disparity vector for each neighboring block. In other words, in NBDV, the IDV candidates only stores one disparity motion vector for each block. In this way, video decoder 30 may perform a disparity vector derivation process that checks one or more blocks that neighbor a current block of the current view component/layer representation in order to determine a disparity vector for the current block. As part of performing the disparity vector derivation process, video decoder 30 may, when the syntax element (e.g., inter_view_l1_disable_flag) indicates that inter-view/layer reference pictures are never included in the reference picture list (e.g., RefPicList1) for the current view component/layer representation, not check motion information corresponding to the reference picture list for the current view component/layer representation. Moreover, in some examples, when the syntax element (e.g., inter_view_l1_disable_flag) indicates that inter-view/layer reference pictures are never included in the reference picture list (e.g., RefPicList1) for the current view component/layer representation, storing at most one implicit disparity vector for each of the one or more blocks that neighbor the current block.

In another example of how the video decoding process performed by video decoder 30 may be simplified when the inter_view_l1_disable_flag is 1, video decoder 30 does not include, in a merge candidate list or an AMVP candidate list, motion candidates that correspond to inter-view/layer reference pictures. For instance, in 3D-HEVC, the merge or AMVP list never requires adding a motion candidate that corresponds to an inter-view/layer reference picture such that potential simplifications are possible. Motion candidates that correspond to inter-view/layer reference pictures may specify reference locations in inter-view/layer reference pictures.

In this example, when the syntax element (e.g., inter_view_l1_disable_flag) indicates that inter-view/layer reference pictures are never included in the reference picture list (e.g., RefPicList1) for the current view component/layer representation, video decoder 30 may never include, in a candidate list, a candidate that corresponds to an inter-view/layer reference picture. Furthermore, when the syntax element indicates that inter-view/layer reference pictures are never included in the reference picture list for the current view component/layer representation, video decoder 30 may determine, based on a particular candidate in the candidate list, a motion vector for a current block of the current view component/layer representation.

In another example of how the video decoding process performed by video decoder 30 may be simplified when the inter_view_l1_disable_flag is 1, video decoder 30 may avoid checking whether a reference picture in RefPicList1 is an inter-view/layer reference picture. Currently in 3D-HEVC, during motion prediction or disparity vector derivation, a video coder may check whether a reference picture in RefPicList0 is an inter-view/layer reference picture and may check whether a reference picture in RefPicList1 is an inter-view/layer reference picture. In other words, checking of whether a reference picture from a reference picture list is an inter-view/layer reference picture or not can be avoided when knowing the list is RefPicList1. Thus, in this example, when the syntax element (e.g., inter_view_l1_disable_flag) indicates that inter-view/layer reference pictures are never included in the reference picture list (RefPicList1) for the current view component/layer representation, video decoder 30 may avoid checking of whether a reference picture from the reference picture list is an inter-view/layer reference picture.

In another example of how the video coding process performed by video decoder 30 may be simplified when the inter_view_l1_disable_flag is 1, the process of determining whether to obtain an inter-view residual prediction flag (e.g., res_pred_flag) for a CU may be simplified. For instance, in 3D-HEVC Working Draft 2, video decoder 30 may obtain, from the bitstream, an inter-view residual prediction flag (e.g., res_pred_flag) for a current CU when a resPredEnableFlag variable is equal to 1. The resPredEnableFlag is equal to 1 when a syntax element in a VPS indicates that inter-view residual prediction is enabled, a coded block flag indicates that the residual for the current CU is non-zero, and an anyTempRefPicFlag variable is equal to 1. The anyTempRefPicFlag is equal to 1 when one or more PUs of the current CU utilize a temporal reference picture. In 3D-HEVC Test Model Description Draft 2, video decoder 30 may initially set the anyTempRefPicFlag to 0. When the prediction mode of the current CU is not intra prediction, the following applies for X being replaced by 0 and 1, and Y being equal to 1−X.

anyTempRefPicFlag=anyTempRefPicFlag||(inter_pred_idc[x0][y0]!=Pred_LY && refViewIdxLX[x0][y0]==ViewIdx)||(inter_pred_idc[x0][y1]!=Pred_LY && refViewIdxLX[x0][y1]==ViewIdx)||(inter_pred_idc[x1][y0]!=Pred_LY && refViewIdxLX[x1][y0]==ViewIdx)||(inter_pred_idc[x1][y1]!=Pred_LY && refViewIdxLX[x1][y1]==ViewIdx)

In the equation above, Pred_LY indicates that a PU of the current CU is prediction from RefPicListY is enabled, refViewIdxLX indicates a view index of a RefPicListX reference picture of a PU of the current CU, and ViewIdx indicates a view index of the current picture.

When the inter_view_l1_disable_flag is equal to 1 and at least one PU of the current CU has a RefPicList1 motion vector, the RefPicList1 motion vector is a temporal motion vector. Hence, if the inter_view_l1_disable_flag is equal to 1 and at least one PU of the current CU has a RefPicList1 motion vector, it may be unnecessary to determine the value of anyTempRefPicFlag because at least one of the PUs of the current CU is coded using a temporal reference picture if the current CU is not coded in intra mode. Hence, when the inter_view_l1_disable_flag is equal to 1 and at least one PU of the current CU is coded using RefPicList1 motion information (i.e., is coded in Pred_L1 or Bi_Pred mode), video decoder 30 may be able to determine the value of resPredEnableFlag without determining the value of anyTempRefPicList. Thus, in 3D-HEVC, the inter-view residual prediction flag may be signaled if only any PU within current CU uses a Pred_L1 mode or Bi_Pred without checking the reference picture types. In ARP, if a PU is coded with Pred_L1 or Bi_Pred mode, the residual predictor generation process of RefPicList1 will always be enabled without checking the reference picture type to determine if the reference picture type is inter-view/layer reference or not. Hence, in this example, when the syntax element (e.g., inter_view_l1_disable_flag) indicates that inter-view/layer reference pictures are never included in the reference picture list (e.g., RefPicList1) for the current view component/layer representation, video decoder 30 may enable, without checking a type of a particular reference picture in the reference picture list, a residual predictor generation process for the reference picture list if a PU of a current CU of the current view component/layer representation has a motion vector that indicates a location in the particular reference picture.

In another example of how the video coding process performed by video decoder 30 may be simplified when the inter_view_l1_disable_flag is 1, video decoder 30 may only use inter-view/layer reference pictures in RefPicList0 for generating view synthesis pictures. Furthermore, when the inter_view_l1_disable_flag is 1, video decoder 30 does not include view synthesis pictures in RefPicList1. That is, view synthesis prediction, which may be extended to the future 3D-HEVC, only uses inter-view reference pictures inserted in RefPicList0 for view synthesis, or never considers a view synthesis picture to be added into RefPicList1. Hence, in this example, when a syntax element (e.g., inter_view_l1_disable_flag) indicates that inter-view/layer reference pictures are never included in the reference picture list (e.g., RefPicList1) for the current view component/layer representation, video decoder 30 may perform view synthesis prediction only using inter-view/layer reference pictures inserted into a different reference picture list (e.g., RefPicList0).

In some examples, when inter_view_l1_disable_flag is 1, video decoder 30 may perform a simplified or more efficiently designed reference picture list construction process. For instance, when inter_view_l1_disable_flag is 1, video decoder 30 does not consider the inter-view/layer RPS or inter-view/layer reference pictures when constructing the initial reference picture list for RefPicList1. Furthermore, as described elsewhere in this disclosure, when inter_view_l1_disable_flag is 1, the RPLM syntax element list_entry_l0[i] may be signaled in a manner different from the RPLM syntax element list_entry_l1[i]. Hence, in this example, when a syntax element (e.g., inter_view_l1_disable_flag) indicates that inter-view/layer reference pictures are never included in the reference picture list for the current view component/layer representation, video decoder 30 may not consider an inter-view/layer reference picture set or inter-view/layer reference pictures when constructing an initial version of the reference picture list.

Furthermore, at least some of the examples of this disclosure mentioned above are managed by a single control flag (i.e., inter_view_l1_disable_flag). However, for purposes of managing simplifications with regard to RefPicList1 in different places, or scenarios, one or more separate control flags may be used to control one or more different places or scenarios. In others examples of this disclosure, references to RefPicList1 may be replaced in some or all cases with references to RefPicList0.

Figure 6:
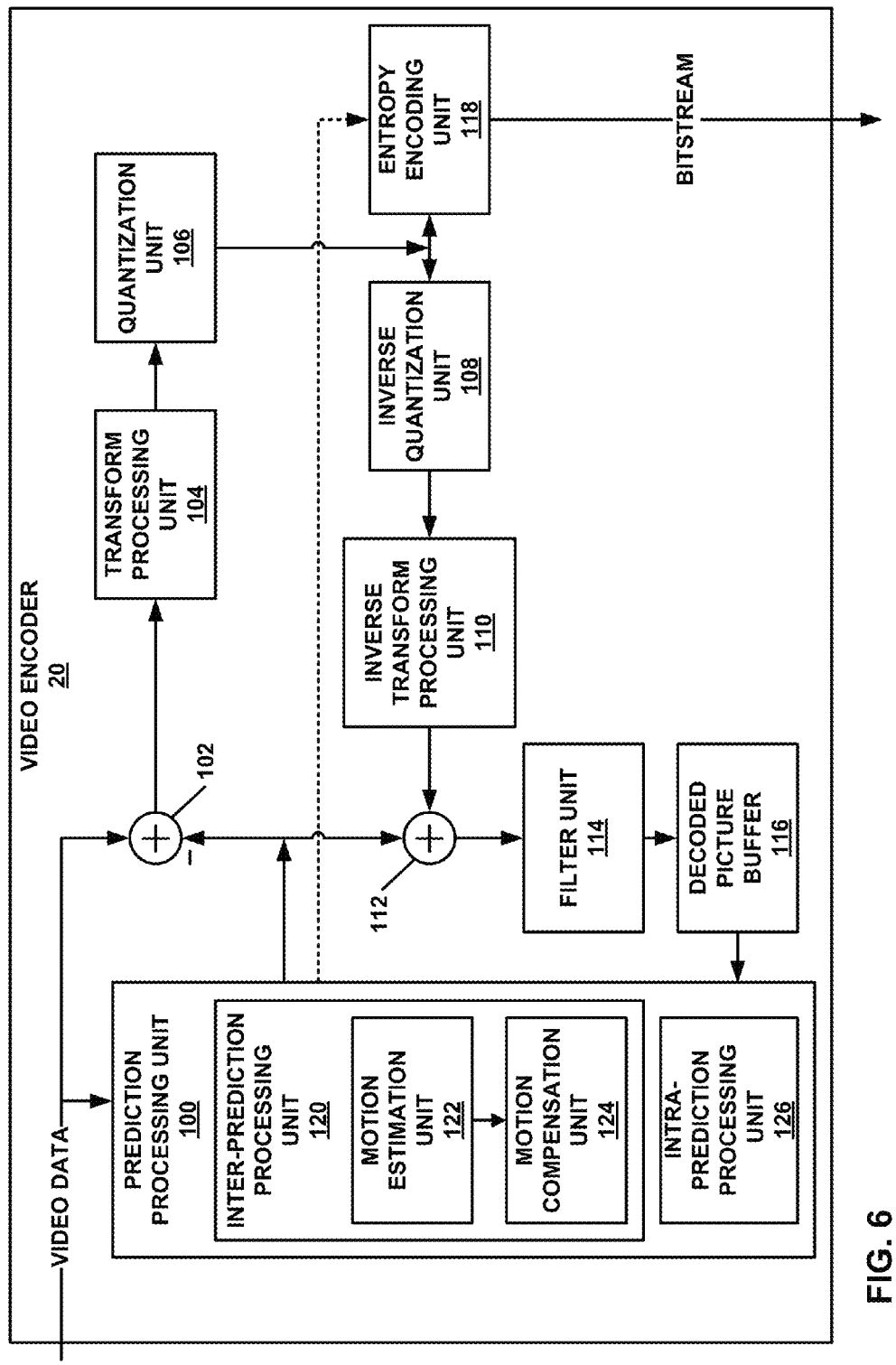
FIG. 6 is a block diagram illustrating an example video encoder that is configured to implement the techniques of this disclosure.

FIG. 6 is a block diagram illustrating an example video encoder 20 that is configured to implement the techniques of this disclosure. FIG. 6 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 6, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, intra prediction may be enabled, but inter prediction is not enabled. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may determine a single motion vector and a single reference index for the PU. In some examples, motion estimation unit 122 may use merge mode or AMVP mode to determine the motion vector and reference index. In some examples, may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may determine two motion vectors and two reference indexes for the PU. In some examples, motion estimation unit 122 may perform merge mode or AMVP mode to determine the motion vectors and reference indexes. In some examples, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on coding blocks of a CU (e.g., luma, Cb and Cr coding blocks of the CU) and the selected predictive blocks of PUs of the CU (e.g., luma, Cb and Cr blocks of the PUs of the CU), one or more residual blocks of the CU (e.g., luma, Cb and Cr residual blocks of the CU). For instance, residual generation unit 102 may generate the residual blocks of the CU such that each sample in the residual blocks has a value equal to a difference between a sample in a coding block of the CU and a corresponding sample in a corresponding selected predictive block of a PU of the CU. In some examples, residual generation unit 102 may comprise a summer.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU. In some examples, reconstruction unit 112 may comprise a summer.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU. Decoded picture buffer 116 may comprise a memory or other type of computer-readable data storage medium.

Figure 7:
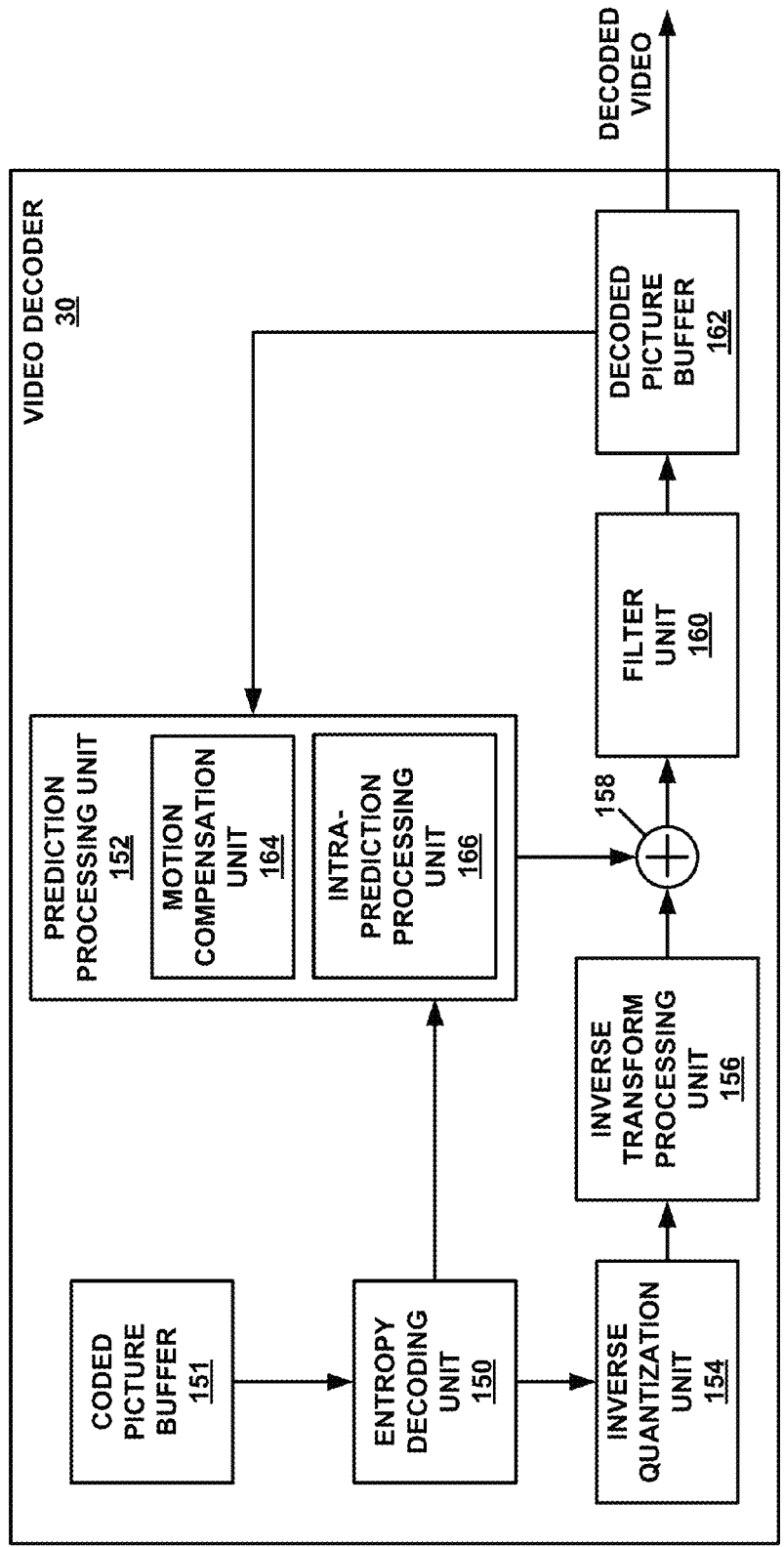
FIG. 7 is a block diagram illustrating an example video decoder that is configured to implement the techniques of this disclosure.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. Furthermore, in accordance with examples of this disclosure, video encoder 20 of FIG. 6 may signal, in the bitstream, a syntax element that indicates whether inter-view/layer reference pictures are ever included in a reference picture list for a current view component/layer representation FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 7, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. CPB 151 may comprise a memory or other type of computer-readable data storage medium. Entropy decoding unit 150 may receive NAL units from CPB 151 and may parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may obtain and entropy decode syntax elements from the coded slice NAL units. Each of the coded slices may include a slice header and slice data. The slice header may contain syntax elements pertaining to a slice. Furthermore, in accordance with one or more examples of this disclosure, entropy decoding unit 150 may obtain, from a bitstream, a syntax element that indicates whether inter-view/layer reference pictures are ever included in a reference picture list for a current view component/layer representation.

In addition to obtaining syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit

164 may generate, based on samples of the one or more reference blocks for the PU, predictive luma, Cb, and Cr blocks for the PU.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU. In some examples, reconstruction unit 158 may comprise a summer.

Filter unit 160 may perform a deblocking operation to reduce blocking artifacts associated with coding blocks of the CU (e.g., the luma, Cb, and Cr coding blocks of the CU). Video decoder 30 may store the coding blocks (e.g., the luma, Cb, and Cr coding blocks) of the CU in decoded picture buffer 162. Decoded picture buffer 162 may comprise a memory or other type of computer-readable data storage medium. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb, and Cr blocks) in decoded picture buffer 162, intra prediction or inter prediction operations on PUs of other CUs. In this way, video decoder 30 may obtain, from the bitstream, transform coefficient levels of the significant coefficient blocks, inverse quantize the transform coefficient levels, apply one or more transforms to the transform coefficient levels to generate transform blocks, generate, based at least in part on the transform blocks, coding blocks, and output the coding blocks for display.

As indicated above, some examples of this disclosure may provide for one or more syntax elements that disable the inclusion of inter-view/layer reference pictures in RefPicList1. For example, a high-level syntax structure, such as a VPS, may include an inter_view_l1_disable_flag syntax element. The inter_view_l1_disable_flag syntax element may indicate whether applicable RefPicList1's may include inter-view/layer reference pictures. In this example, the applicable RefPicList1's may be the RefPicList1's of coded pictures/layer representations that refer to the high-level syntax structure. Furthermore, in this example, when the inter_view_l1_disable_flag syntax element indicates that applicable RefPicList1's may include inter-view/layer reference pictures, a slice header of a slice may include a syntax element (e.g., inter_view_ref_start_position_l1_plus) that indicates a starting position of inter-view/layer reference pictures in the RefPicList1 applicable to the slice. Table 4, below, shows an example slice header syntax in accordance with this example. In Table 4, the underlined text indicates text added to MV-HEVC Working Draft 2 and/or 3D-HEVC Test Model Description Draft 2.

TABLE 4

| slice_header( ) { | Descriptor |
|---|---|
| first_slice_in_pic_flag | u(1) |
| ... | |
| if( slice_header_extension_present_flag ) { // should always be true in MV-HEVC | |
|     slice_header_extension_length | ue(v) |
|     if( slice_type != I_SLICE ) { | |
|         <u>inter_view_ref_start_position_l0_plus1</u> | <u>ue(v)</u> |
|         <u>if ( !inter_view_l1_disable_flag )</u> | |

TABLE 4-continued

| slice_header( ) { | Descriptor |
|---|---|
|         <u>inter_view_ref_start_position_l1_plus1</u> | <u>ue(v)</u> |
|     ... | |
|     } | |
|     byte_alignment( ) | |
| } | |

In Table 4, the inter_view_ref_start_position_l0_plus1 syntax element has the same semantics as that of the inter_view_ref_start_position_plus1 syntax element in JCT3V-C0060, as described above. Furthermore, in Table 4, the inter_view_ref_start_position_l1_plus1 syntax element has similar semantics as that of inter_view_ref_start_position_plus1 in JCT3V-C0060, but is applicable to RefPicList1. Thus, in the example of Table 4, video encoder 20 may signal that inter-view/layer reference pictures are to be inserted at an arbitrary position in RefPicList1 without necessarily signaling any RPLM syntax elements (e.g., list_entry_l1 syntax elements). Thus, the use of the inter_view_ref_start_position_l1_plus1 syntax element may reduce the size of the bitstream. Furthermore, a single inter_view_l1_disable_flag syntax element may be applicable to multiple pictures and video encoder 20 only signals the inter_view_ref_start_position_l1_plus1 syntax element for a slice of a picture when the inter_view_l1_disable_flag syntax element applicable to the picture is 0. Hence, the use of the inter_view_l1_disable_flag syntax element may further reduce the size of the bitstream by reducing the number of signaled inter_view_ref_start_position_l1_plus1 syntax elements.

Hence, in the example of Table 4, the inter_view_l1_disable_flag may be a first syntax element and video encoder 20 may signal, in the bitstream, a second syntax element (e.g., inter_view_ref_start_position_l0_plus1). The second syntax element may indicate a starting position of inter-view/layer reference pictures in RefPicList0 for the current view component/layer representation. Similarly, video decoder 30 may obtain, from the bitstream, the second syntax element (e.g., inter_view_ref_start_position_l0_plus1). Furthermore, in the example of Table 4, when the inter_view_l1_disable_flag indicates that inter-view/layer reference pictures are included in the first reference picture list for the current view component/layer representation (e.g., RefPicList1), the video coder may obtain, from the bitstream, a third syntax element (e.g., inter_view_ref_start_position_l1_plus1). The third syntax element may indicate a starting position of inter-view/layer reference pictures in the first reference picture list for the current view component/layer representation (e.g., RefPicList1).

Furthermore, the techniques of this disclosure may modify the reference picture list modification semantics defined in MV-HEVC Working Draft 2 and/or 3D-HEVC Test Model Description Draft 2. As described elsewhere in this disclosure, video decoder 30 may perform RPLM on the basis of list_entry_l0 syntax elements and list_entry_l1 syntax elements. Furthermore, as described elsewhere in this disclosure, video decoder 30 may determine the length of (e.g., the number of bits of) each list_entry_l0 syntax element and each list_entry_l1 syntax element based on a NumPocTotalCurr variable. In HEVC Working Draft 8, NumPocTotalCurr is set equal to NumPocStCurrBefore+NumPocStCurrAfter+NumPocLtCurr. NumPocStCurrBefore indicates the number of elements in RefPicSetStBefore. NumPocStCurrAfter indicates the number of elements in RefPicSetStAfter. NumPocLtCurr indicates the number of elements in RefPicSetLtCurr.

However, in MV-HEVC and 3D-HEVC, a reference picture list may include inter-view/layer reference pictures. Hence, the definition of NumPocTotalCurr may be different. In the text below, the underlined text is added to MV-HEVC Working Draft 2 and/or 3D-HEVC Test Model Description Draft 2. As shown in the text below, the variable NumPocTotalCurr may be derived as follows.

```
NumPocTotalCurr = 0;
for( i = 0; i < NumNegativePics[ StRpsIdx ]; i++)
    if(UsedByCurrPicS0[ StRpsIdx ][ i ] = = 1)
        NumPocTotalCurr++
for( i = 0; i < NumPositivePics[ StRpsIdx ]; i++)                    (7-56)
    if(UsedByCurrPicS1[ StRpsIdx ][ i ] = = 1)
        NumPocTotalCurr++
for( i = 0; i < num_long_term_sps + num_long_term_pics; i++ )
    if( UsedByCurrPicLt[ i ] = = 1)
        NumPocTotalCurr++
```
The variable NumPocTotalCurr is set equal to NumPocStCurrBefore + NumPocStCurrAfter + NumPocLtCurr + NumIvCurr, wherein NumIvCurr is the number of entries in the inter-view/layer RPS.

Furthermore, in this example, the list_entry_l0[i] and list_entry_l1[i] syntax elements may have the following semantics:

list_entry_l0[i] specifies the index of the reference picture in RefPicListTemp0 to be placed at the current position of reference picture list 0. The length of the list_entry_l0[i] syntax element is Ceil(Log 2(NumPocTotalCurr)) bits. The value of list_entry_l0[i] shall be in the range of 0 to NumPocTotalCurr−1, inclusive. If the syntax element list_entry_l0[i] is not present, it is inferred to be equal to 0.

list_entry_l1[i] specifies the index of the reference picture in RefPicListTemp1 to be placed at the current position of reference picture list 1. The length of the list_entry_l1[i] syntax element is Ceil(Log 2(NumPocTotalCurr)) bits. The value of list_entry_l1[i] shall be in the range of 0 to NumPocTotalCurr−1, inclusive. If the syntax element list_entry_l1[i] is not present, it is inferred to be equal to 0.

The semantics for the list_entry_l0[i] and list_entry_l1[i] syntax elements in this example may be similar to those defined for the list_entry_l0[i] and list_entry_l1[i] syntax elements in HEVC Working Draft 8. However, because this example provides a different definition of NumPocTotalCurr, the length and range of the list_entry_l0[i] and list_entry_l1[i] syntax elements may be different than in HEVC Working Draft 8.

Furthermore, some examples of this disclosure may modify the RPLM process of MV-HEVC and/or 3D-HEVC. For example, the definition of the variable NumPocTotalCurr in the RPLM process of MV-HEVC and 3D-HEVC, as defined in MV-HEVC Working Draft 2 and 3D-HEVC Test Model Description Draft 2, may be modified such that NumPocTotalCurr is dependent on the variable NumIvCurr. As indicated above, NumIvCurr may be the number of entries in the inter-view/layer RPS. Specifically, in one example of this disclosure, the variable NumPocTotalCurr may be defined, with regard to the semantics of list_entry_l0 syntax elements, as:

The variable NumPocTotalCurr is set equal to NumPocStCurrBefore+NumPocStCurrAfter+NumPocLtCurr+NumIvCurr.

Furthermore, in this example, the list_entry_l0[i] syntax element may have the following semantics:

list_entry_l0[i] specifies the index of the reference picture in RefPicListTemp0 to be placed at the current position of reference picture list 0. The length of the list_entry_l0[i] syntax element is Ceil(Log 2(NumPocTotalCurr)) bits. The value of list_entry_l0[i] shall be in the range of 0 to NumPocTotalCurr−1, inclusive. If the syntax element list_entry_l0[i] is not present, it is inferred to be equal to 0.

In accordance with this example, if inter_view_l1_disable_flag is 1, the variable NumPocTotalCurr is further modified, with regard to the semantics of list_entry_l1[i] syntax elements, such that NumPocTotalCurr is equal to NumPocStCurrBefore+NumPocStCurrAfter+NumPocLtCurr. In this example, list_entry_l1[i] may have the following semantics:

list_entry_l1[i] specifies the index of the reference picture in RefPicListTemp1 to be placed at the current position of reference picture list 1. The length of the list_entry_l1[i] syntax element is Ceil(Log 2(NumPocTotalCurr)) bits. The value of list_entry_l1[i] shall be in the range of 0 to NumPocTotalCurr−1, inclusive. If the syntax element list_entry_l1[i] is not present, it is inferred to be equal to 0.

In another example of this disclosure, the semantics of list_entry_lX[i] (with X being equal to 0 or 1) defined in MV-HEVC Working Draft 2 and/or 3D-HEVC Test Model Description Draft 2 are modified as follows. In the following description of the semantics of list_entry_lX[i], the underlined text is text added to the semantics of list_entry_l0 and list_entry_l1 in MV-HEVC Working Draft 2 and/or 3D-HEVC Test Model Description Draft 2.

list_entry_lX[i] specifies the index of the reference picture in RefPicListTempX to be placed at the current position of reference picture list X. The length of the list_entry_lX[i] syntax element is Ceil(Log 2(NumPocTotalCurrLX)) bits. The value of list_entry_lX[i] shall be in the range of 0 to NumPocTotalCurrLX−1, inclusive. If the syntax element list_entry_lX[i] is not present, it is inferred to be equal to 0. When inter_view_l1_disable_flag is equal to 1, (NumPocTotalCurrL1−NumPocTotalCurrL0) is equal to NumIvCurr. NumPocTotalCurrLX is derived as follows:

NumPocTotalCurrLX=NumPocStCurrBefore+NumPocStCurrAfter+NumPocLtCurr+((inter_view_ _l1_disable_flag && X)?0: NumIvCurr).

As shown in the example semantics for list_entry_l1 (and list_entry_lX), the length of each list_entry_l1 syntax element is dependent on the total number of reference pictures in RefPicList1 (i.e., NumPocTotalCurr). Hence, if there are fewer reference pictures in RefPicList1, each of the list_entry_l1 syntax elements includes fewer bits. If the inter_view_l1_disable_flag is 1, there are fewer reference pictures in RefPicList1 because RefPicList1 does not include inter-view/layer reference pictures. Hence, if the inter_view_l1_disable_flag applicable to a picture is 1, each list_entry_l1 syntax element for the picture's RefPicList1 may include fewer bits.

Hence, video decoder 30 may obtain, from the bitstream, reference picture list modification (RPLM) syntax elements for modifying the reference picture list (e.g., list_entry_l1 syntax elements) and when the inter_view_l1_disable_flag indicates that inter-view/layer reference pictures are never included in the reference picture list, the RPLM syntax elements include fewer bits than when the syntax element indicates that inter-view/layer reference pictures are included in the reference picture list. Similarly, video encoder 20 may signal, in the bitstream, RPLM syntax elements for modifying the reference picture list (e.g., list_entry_l1 syntax elements) and when the inter_view_l1_disable_flag indicates that inter-view/layer reference pictures are never included in the reference picture list, each of the RPLM syntax elements may include fewer bits than when the syntax element indicates that inter-view/layer reference pictures are included in the reference picture list. In at least this way, the use of the inter_view_l1_disable_flag may reduce the size of the bitstream.

Figure 8A:
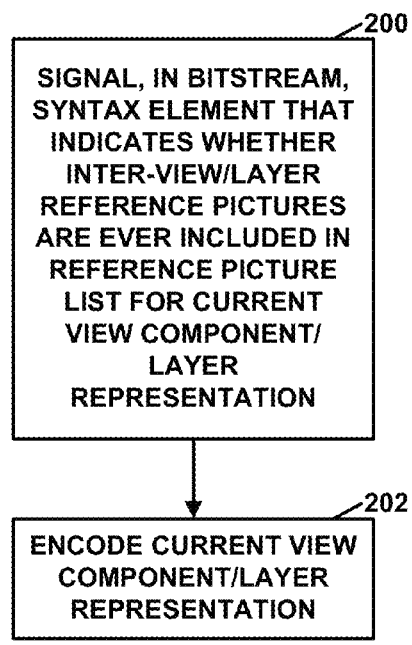
FIG. 8A is a flowchart illustrating an operation of a video encoder, in accordance with an example of this disclosure.

FIG. 8A is a flowchart illustrating an operation of video encoder 20, in accordance with an example of this disclosure. In the example of FIG. 8A, video encoder 20 may signal, in a bitstream that comprises an encoded representation of video data, a syntax element that indicates whether inter-view/layer reference pictures are ever included in a reference picture list for a current view component/layer representation (200). In some examples, video encoder 20 may signal an inter_view_l1_disable_flag syntax element in a VPS. In some such examples, the inter_view_l1_disable_flag syntax element may indicate, for each respective view component/layer representation of the CVS, whether inter-view/layer reference pictures are ever included a respective reference picture list for the respective view component/layer representation. Furthermore, in some such examples, video encoder 20 may signal, in the bitstream, for each respective view component/layer representation of the CVS that refers to the VPS, a respective first syntax element (e.g., inter_view_ref_start_position_l0_plus1) that indicates a starting position of inter-view/layer reference pictures in a respective second reference picture list (e.g., RefPicList0) for the respective view component/layer representation.

In other examples, video encoder 20 may signal inter_view_l1_disable_flag syntax elements for each respective layer from a plurality of layers in the bitstream. In such examples, the inter_view_l1_disable_flag syntax element for a respective layer the syntax element indicates whether inter-view/layer reference pictures are ever included in respective reference picture lists of view components/layer representations in the respective layer. Furthermore, in some examples, video encoder 20 may signal, in the bitstream, for each respective view component/layer representation of each of the plurality of layers, a respective additional syntax element (e.g., inter_view_ref_start_position_l1_plus1) that indicates a starting position of inter-view/layer reference pictures in a respective additional reference picture list for the respective view component/layer representation.

In addition, video encoder 20 may encode the current view component/layer representation (202). As described in various examples of this disclosure, when the inter_view_l1_disable_flag syntax element is 1, video encoder 20 does not use inter-view/layer reference pictures in the reference picture list (e.g., RefPicList1) to encode the current view component/layer representation.

Figure 8B:
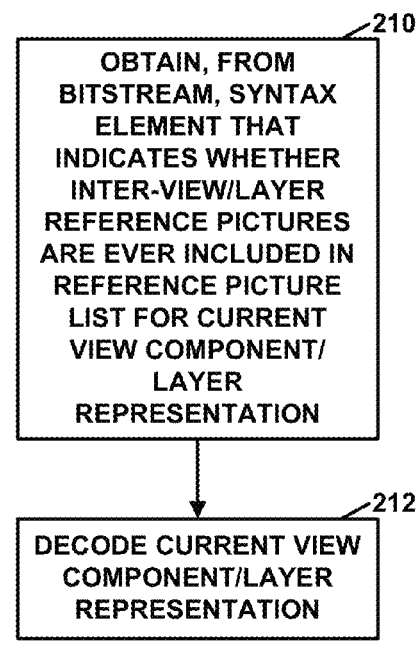
FIG. 8B is a flowchart illustrating an operation of a video decoder, in accordance with an example of this disclosure.

FIG. 8B is a flowchart illustrating an operation of video decoder 30, in accordance with an example of this disclosure. In the example of FIG. 8B, video decoder 30 obtains, from a bitstream, a syntax element (e.g., inter_view_l1_disable_flag) that indicates whether inter-view/layer reference pictures are ever included in a reference picture list for a current view component/layer representation (210). In some examples, the current view component/layer representation may be part of a CVS that refers to a VPS. In such examples, video decoder 30 may obtain the syntax element from the VPS. Furthermore, in such examples, the syntax element may indicate, for each respective view component/layer representation of the CVS, whether inter-view/layer reference pictures are ever included a respective reference picture list for the respective view component/layer representation. In some examples, entropy decoding unit 150 (FIG. 7) may obtain the syntax element from the bitstream.

In other examples, the current view component/layer representation is in a particular layer in a plurality of layers in the bitstream. In such examples, video decoder 30 may obtain, for each respective layer from the plurality of layers, a respective syntax element for the respective layer that indicates whether inter-view/layer reference pictures are ever included in respective reference picture lists of view components/layer representations in the respective layer.

Video decoder 30 may decode the current view component/layer representation (212). When the syntax element indicates that inter-view/layer reference pictures are never included in the reference picture list, video decoder 30 decodes the current view component/layer representation without use of inter-view/layer reference pictures in the reference picture list.

Figure 9:
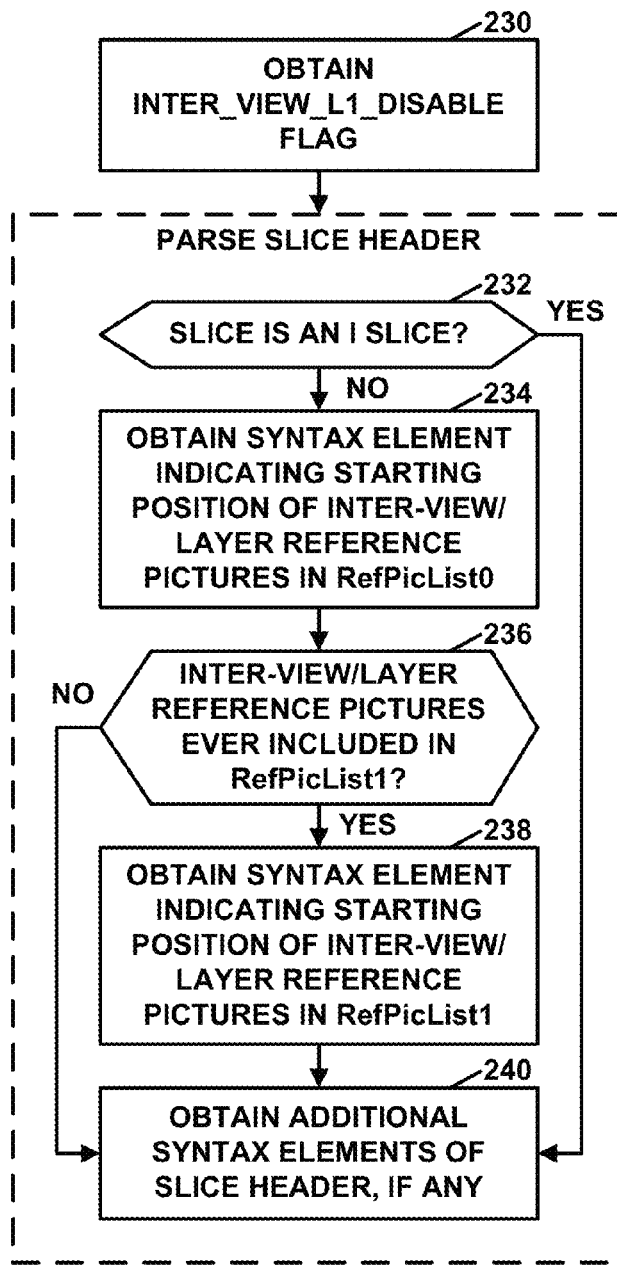
FIG. 9 is a flowchart illustrating an example operation for parsing a slice header, in accordance with an example of this disclosure.

FIG. 9 is a flowchart illustrating an example operation for parsing a slice header, in accordance with an example of this disclosure. As indicated above with regard to the example of Table 4, slice headers may adaptively include syntax elements (i.e., inter_view_ref_start_position_l1_plus1 syntax elements) indicating starting positions of inter-view/layer reference pictures in RefPicList1.

Specifically, in the example of FIG. 9, video decoder 30 may obtain, from a bitstream, an inter_view_l1_disable_flag (230). In some examples, video decoder 30 may obtain the inter_view_l1_disable_flag from a VPS. In other examples, video decoder 30 may obtain the inter_view_l1_disable_flag from a SPS or another syntax structure. For instance, when video encoder 20 signals an inter_view_l1_disable_flag for each view/layer, video encoder 20 may signal inter_view_l1_disable flags in SPSs applicable to CVSs within each of the layers. In some examples, entropy decoding unit 150 (FIG. 7) may obtain the syntax element from the bitstream.

Furthermore, in the example of FIG. 9, video decoder 30 may parse a slice header for a slice of a current picture to obtain syntax elements of the slice header. In some examples, entropy decoding unit 150 may parse the slice header. As part of parsing the slice header, video decoder 30 may determine whether the slice is an I slice (232). In other words, video decoder 30 may determine whether inter prediction is allowed in the slice. Responsive to determining that the slice is not an I slice (i.e., the block is a P or B slice) ("YES" of 232), video decoder 30 may obtain, from the slice header, a syntax element (e.g., inter_view_ref_start_position_l0_plus1) that indicates a starting position of inter-view/layer reference pictures in the current picture's RefPicList0 (234).

Thus, in some examples where the current view component/layer representation is part of a CVS that refers to a VPS and the inter_view_l1_disable_flag is signaled in the VPS, video decoder 30 may obtain, for each respective view component/layer representation of the CVS, a respective additional syntax element (e.g., inter_view_ref_start_position_l0_plus1) that indicates a starting position of inter-view/layer reference pictures in a respective second reference picture list for the respective view component/layer representation.

Furthermore, in some examples where an inter_view_l1_disable_flag is signaled for each layer in a plurality of layers of a bitstream, video decoder 30 may obtain, for each respective view component/layer representation of each of the plurality of layers, a respective additional syntax element (e.g., inter_view_ref_start_position_l0_plus1) that indicates a starting position of inter-view/layer reference pictures in a respective additional reference picture list for the respective view component/layer representation.

Furthermore, video decoder 30 may determine, based on the inter_view_l1_disable_flag, whether inter-view/layer reference pictures are ever included in the current picture's RefPicList1 (236). Responsive to determining that inter-view/layer reference pictures are included in the current picture's RefPicList1 ("YES of 236), video decoder 30 may obtain, from the slice header, a syntax element (e.g., inter_view_ref_start_position_l1_plus1) that indicates a starting position of inter-view/layer reference pictures in RefPicList1 (238).

Subsequently, or responsive to determining that the slice is an I slice ("YES" of 232), or responsive to determining that inter-view/layer reference pictures are never included in the current picture's RefPicList1 ("NO" of 236), video decoder 30 may obtain additional syntax elements of the slice header, if any (240).

Figure 10:
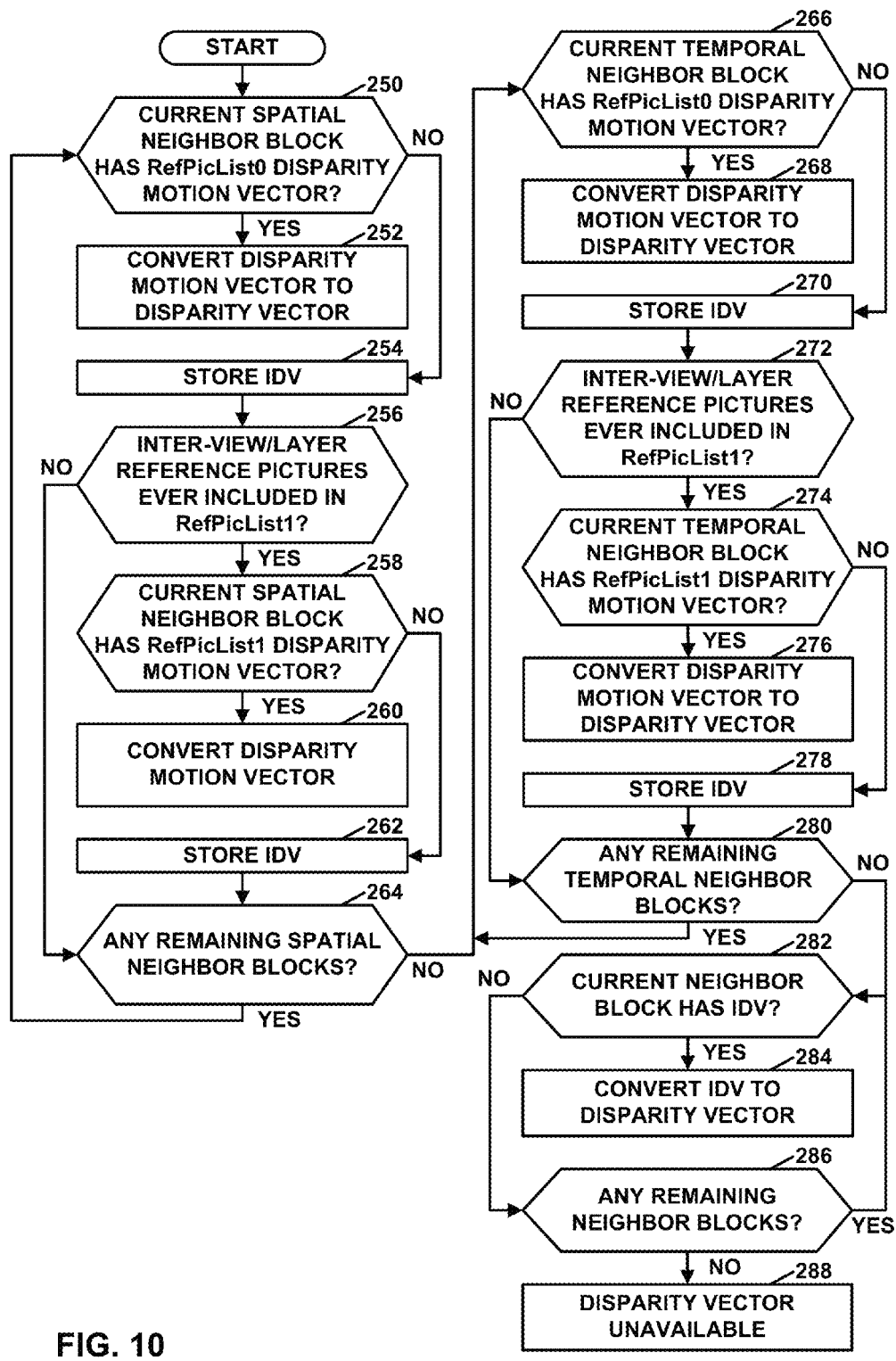
FIG. 10 is a flowchart illustrating a neighboring block based disparity vector (NBDV) derivation process, in accordance with an example of this disclosure.

FIG. 10 is a flowchart illustrating a neighboring block based disparity vector (NBDV) derivation process, in accordance with an example of this disclosure. In the example of FIG. 10, a video coder (e.g., video encoder 20 or video decoder 30), may determine whether a current spatial neighbor block has a RefPicList0 disparity motion vector (250). The current spatial neighbor block may be one of the spatial neighboring blocks of a current block. In response to determining that the current spatial neighbor block has a RefPicList0 disparity motion vector ("YES" of 250), the video coder may convert the RefPicList0 disparity motion vector of the current spatial neighbor block into the disparity vector for the current block (252). The video coder may then end the NBDV derivation process.

On the other hand, in response to determining that the current spatial neighbor block does not have a RefPicList0 disparity motion vector ("NO" of 252), the video coder may store an IDV for the current spatial neighbor block (254). In some examples, the video coder may store the IDV for the current spatial neighbor block only if the prediction mode of the current spatial neighbor block is coded using skip mode. In some examples, the video coder may store the IDV in a decoded picture buffer (e.g., decoded picture buffer 116 or decoded picture buffer 162). Furthermore, the video coder may determine whether the inter_view_l1_disable_flag indicates that inter-view/layer reference pictures are ever included in the current spatial neighbor block's RefPicList1 (256).

Responsive to determining that the inter_view_l1_disable_flag indicates that inter-view/layer reference pictures may be included in the RefPicList1 of the picture that contains the current spatial neighboring block (i.e., the current spatial neighbor block's RefPicList1) ("YES" of 256), the video coder may determine whether the current spatial neighbor block has a RefPicList1 disparity motion vector (258). In response to determining that the current spatial neighbor block has a RefPicList1 disparity motion vector ("YES" of 258), the video coder may convert the RefPicList1 disparity motion vector for the current spatial neighbor block into the disparity vector for the current block (260). The video coder may then end the NBDV derivation process.

On the other hand, responsive to determining that the current spatial neighbor block does not have a RefPicList1 disparity motion vector ("NO" of 258), the video coder may store an IDV for the current spatial neighbor block (262). In some examples, the video coder may store the IDV for the current spatial neighbor block only if the prediction mode of the current spatial neighbor block is coded using skip mode. Thus, the video coder may potentially store two IDVs for the current spatial neighbor block. In some examples, the video coder may store the IDV in a decoded picture buffer (e.g., decoded picture buffer 116 or decoded picture buffer 162).

In response to determining that the inter_view_l1_disable_flag indicates that inter-view/layer reference pictures are never included in the current spatial neighbor block's RefPicList1 ("NO" of 256), or after storing the IDV for the current spatial neighbor block in 262, the video coder may determine whether there are any remaining spatial neighboring blocks to check (264). In response to determining that there are one or more remaining spatial neighboring blocks to check ("YES" of 264), the video coder may repeat actions 252-264 with one of the remaining spatial neighboring blocks as the current spatial neighbor block. Thus, in accordance with this example of this disclosure, when the inter_view_l1_disable_flag indicates that inter-view/layer reference pictures are never included in the current spatial neighbor block's RefPicList1, the video coder stores at most one IDV for the current spatial neighbor block.

Furthermore, in response to determining that there are no remaining spatial neighboring blocks ("NO" of 264), the video coder may determine whether a current temporal neighbor block has a RefPicList0 disparity motion vector (266). The current temporal neighbor block may be one of the temporal neighboring blocks of the current block. In response to determining that the current temporal neighbor block has a RefPicList0 disparity motion vector ("YES" of 266), the video coder may convert the RefPicList0 disparity motion vector of the current temporal neighbor block into the disparity vector for the current block (268). The video coder may then end the NBDV derivation process.

On the other hand, in response to determining that the current temporal neighbor block does not have a RefPicList0 disparity motion vector ("NO" of 266), the video coder may store an IDV for the current temporal neighbor block (270). In some examples, the video coder may store the IDV for the current temporal neighbor block only if the prediction mode of the current temporal neighbor block is coded using skip mode. In some examples, the video coder may store the IDV in a decoded picture buffer (e.g., decoded picture buffer 116 or decoded picture buffer 162). In addition, the video coder may determine whether the inter_view_l1_disable_flag indicates that inter-view/layer reference pictures are ever included in the current temporal neighbor block's RefPicList1 (272). Responsive to determining that the inter_view_l1_disable_flag indicates that inter-view/layer reference pictures may be included in the current temporal neighbor block's RefPicList1 ("YES" of 272), the video coder may determine whether the current temporal neighbor block has a RefPicList1 disparity motion vector (274). In response to determining that the current temporal neighbor block has a RefPicList1 disparity motion vector ("YES" of 274), the video coder may convert the RefPicList1 disparity motion vector for the current temporal neighbor block into the disparity vector for the current block (276). The video coder may then end the NBDV derivation process.

On the other hand, responsive to determining that the current temporal neighbor block does not have a RefPicList1 disparity motion vector ("NO" of 274), the video coder may store an IDV for the current temporal neighbor block (278). In some examples, the video coder may store the IDV for the current temporal neighbor block only if the prediction mode of the current temporal neighbor block is coded using skip mode. Thus, the video coder may potentially store two IDVs for the current temporal neighbor block. In some examples, the video coder may store the IDV in a decoded picture buffer (e.g., decoded picture buffer 116 or decoded picture buffer 162).

In response to determining that the inter_view_l1_disable_flag indicates that inter-view/layer reference pictures are never included in the current temporal neighbor block's RefPicList1 ("NO" of 272), or after storing the IDV for the current temporal neighbor block in (278), the video coder may determine whether there are any remaining temporal neighboring blocks to check (280). In response to determining that there are one or more remaining temporal neighboring blocks to check ("YES" of 280), the video coder may repeat actions 266-280 with one of the remaining temporal neighboring blocks as the current temporal neighbor block. Thus, in accordance with this example of this disclosure, when the inter_view_l1_disable_flag indicates that inter-view/layer reference pictures are never included in the current temporal neighbor block's RefPicList1, the video coder stores at most one IDV for the current temporal neighbor block.

Responsive to determining that there are no remaining temporal neighbor blocks ("NO" of 280), the video coder may determine whether a current neighbor block has an IDV (282). The current neighbor block may be one of the spatial neighboring blocks of a current block or one of the spatial temporal neighboring blocks. In some examples, the video coder checks the spatial neighboring blocks for IDVs prior to checking any of the temporal neighboring blocks for IDVs. Responsive to determining that the current spatial neighbor block has an IDV ("YES" of 282), the video coder may convert the IDV of the current neighbor block to the disparity vector of the current block (284). However, responsive to determining that the current neighbor block does not have an IDV ("NO" of 282), the video coder may determine whether there are any remaining neighbor blocks (286). In response to determining that there are one or more remaining neighboring blocks to check ("YES" of 286), the video coder may repeat actions 282-286 with one of the remaining neighboring blocks as the current neighbor block. On the other hand, responsive to determining that there are no remaining neighbor blocks ("NO" of 286), the video coder may determine that the disparity vector for the current block is unavailable (288).

Thus, as shown in the example of FIG. 10, when inter_view_l1_disable_flag indicates that RefPicList1 never includes inter-view/layer reference pictures, the motion information is never checked. Consequently, the complexity of the NBDV derivation process of FIG. 10 may be decreased by a factor of two. In some examples, the operation of FIG. 10 may be performed by inter-prediction processing unit 120 (FIG. 6) of video encoder 20 or prediction processing unit 152 (FIG. 7) of video decoder 30.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

Any details of any of the examples above may be combined with other examples, consistent with this disclosure. In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various examples have been described. These and other examples are within the scope of the following claims.

What is claimed is:

1. A method for decoding video data, the method comprising:
    obtaining, from a video parameter set (VPS) in a bitstream, a syntax element that indicates whether inter-view/layer reference pictures are ever included in a second reference picture list for any view component/layer representation of any coded video sequence (CVS) that refers to the VPS;
    constructing, based on pictures in a reference picture set, a first reference picture list and a second reference picture list for a current view component/layer representation of a CVS that refers to the VPS, wherein at least one inter-view/layer reference picture is present in the first reference picture list for the current view component/layer representation; and
    decoding the current view component/layer representation, wherein when the syntax element indicates that inter-view/layer reference pictures are never included in the second reference picture list for any view component/layer representation of any CVS that refers to the VPS, the current view component/layer representation is decoded without use of inter-view/layer reference pictures in the second reference picture list for the current view component/layer representation.

2. The method of claim 1, wherein decoding the current view component/layer representation comprises:
    performing a disparity vector derivation process that checks one or more blocks that neighbor a current block of the current view component/layer representation in order to determine a disparity vector for the current block, and
    wherein performing the disparity vector derivation process comprises: when the syntax element indicates that inter-view/layer reference pictures are never included in the second reference picture list for any view component/layer representation of any coded video sequence that refers to the VPS, not checking motion information corresponding to the second reference picture list for the current view component/layer representation.

3. The method of claim 1, wherein the current view component/layer representation is in a particular layer in a plurality of layers in the bitstream, and the method comprises:
    obtaining, for each respective layer from the plurality of layers, a respective syntax element for the respective layer, the respective syntax element indicating whether inter-view/layer reference pictures are ever included in respective second reference picture lists for view components/layer representations that are in the respective layer and that are in any CVS that refers to the VPS.

4. The method of claim 1, further comprising obtaining, from the bitstream, reference picture list modification (RPLM) syntax elements for modifying the first reference picture list for the current view component/layer representation, wherein when the syntax element indicates that inter-view/layer reference pictures are never included in the second reference picture list for any view component/layer representation of any CVS that refers to the VPS, each of the RPLM syntax elements includes fewer bits than when the syntax element indicates that inter-view/layer reference pictures can be included in the second reference picture list for view component/layer representations of coded video sequences that refer to the VPS.

5. The method of claim 1, wherein the syntax element is a first syntax element and the method further comprises obtaining, from the bitstream, a second syntax element, the second syntax element indicating a starting position of inter-view/layer reference pictures in the first reference picture list for the current view component/layer representation.

6. The method of claim 5, wherein when the first syntax element indicates that inter-view/layer reference pictures can be included in the second reference picture lists for view component/layer representations of coded video sequences that refer to the VPS, obtaining, from the bitstream, a third syntax element, the third syntax element indicating a starting position of inter-view/layer reference pictures in the second reference picture list for the current view component/layer representation.

7. The method of claim 1, wherein decoding the current view component/layer representation comprises:
    performing a disparity vector derivation process that checks one or more blocks that neighbor a current block of the current view component/layer representation in order to determine a disparity vector for the current block,
    wherein performing the disparity vector derivation process comprises: when the syntax element indicates that inter-view/layer reference pictures are never included in the second reference picture list for any view component/layer representation of any CVS that refers to the VPS, storing at most one implicit disparity vector for each of the one or more blocks that neighbor the current block.

8. The method of claim 1, wherein:
    decoding the current view component/layer representation comprises:
        when the syntax element indicates that inter-view/layer reference pictures are never included in the second reference picture list for any view component/layer representation of any coded video sequence that refers to the VPS, a candidate list does not include a candidate that corresponds to an inter-view/layer reference picture; and determining, based on a particular candidate in the candidate list, a motion vector for a current block of the current view component/layer representation.

9. The method of claim 1, further comprising:

when the syntax element indicates that inter-view/layer reference pictures are never included in the second reference picture list for any view component/layer representation of any CVS that refers to the VPS, avoiding checking of whether a reference picture from the second reference picture list of the current view component/layer representation is an inter-view/layer reference picture; and when the syntax element indicates that inter-view/layer reference pictures are never included in the reference picture list for any view component/layer representation of any CVS that refers to the VPS, enabling, without checking a type of a particular reference picture in the second reference picture list for the current view component/layer representation, a residual predictor generation process for the second reference picture list for the current view component/layer representation if a prediction unit (PU) of a current coding unit (CU) of the current view component/layer representation has a motion vector that indicates a location in the particular reference picture.

10. The method of claim 1, further comprising:

when the syntax element indicates that inter-view/layer reference pictures are never included in the second reference picture list for any view component/layer representation of any CVS that refers to the VPS, performing view synthesis prediction only using inter-view/layer reference pictures inserted into the first reference picture list for the current view component/layer representation; and when the syntax element indicates that inter-view/layer reference pictures are never included in the second reference picture list for any view component/layer representation of any CVS that refers to the VPS, not considering an inter-view/layer reference picture set or inter-view/layer reference pictures when constructing an initial version of the second reference picture list for the current view component/layer representation.

11. A method of encoding video data, the method comprising:

constructing, based on pictures in a reference picture set, a first reference picture list and a second reference picture list for a current view component/layer representation, the current view component/layer representation belonging to a coded video sequence (CVS) that refers to a video parameter set (VPS), wherein at least one inter-view/layer reference picture is present in the first reference picture list for the current view component/layer representation;

signaling, in the VPS in a bitstream, a syntax element that indicates whether inter-view/layer reference pictures are ever included in a second reference picture list for any view component/layer representation of any CVS that refers to the VPS; and encoding the current view component/layer representation, wherein when the syntax element indicates that inter-view/layer reference pictures are never included in the second reference picture list for any view component/layer representation of any CVS that refers to the VPS, the current view component/layer representation is not encoded using inter-view/layer reference pictures in the second reference picture list for the current view component/layer representation.

12. The method of claim 11, wherein the current view component/layer representation is in a particular layer in a plurality of layers in the bitstream, and the method comprises:

signaling, in the VPS, for each respective layer from the plurality of layers, a respective syntax element for the respective layer, the respective syntax element indicating whether inter-view/layer reference pictures are ever included in respective second reference picture lists for view components/layer representations that are in the respective layer and that are in any CVS that refers to the VPS.

13. The method of claim 11, further comprising signaling, in the bitstream, reference picture list modification (RPLM) syntax elements for modifying the second reference picture list for the current view component/layer representation, wherein when the syntax element indicates that inter-view/layer reference pictures are never included in the second reference picture list for any view component/layer representation of any CVS that refers to the VPS, each of the RPLM syntax elements includes fewer bits than when the syntax element indicates that inter-view/layer reference pictures can be included in the second reference picture lists for view component/layer representations of any CVS that refers to the VPS.

14. The method of claim 11, wherein the syntax element is a first syntax element and the method further comprises signaling, in the bitstream, a second syntax element, the second syntax element indicating a starting position of inter-view/layer reference pictures in the first reference picture list for the current view component/layer representation.

15. A video decoding device comprising a non-transitory storage medium and one or more processors coupled to the storage medium, the one or more processors configured to:

obtain, from a video parameter set (VPS) in a bitstream, a syntax element that indicates whether inter-view/layer reference pictures are ever included in a second reference picture list for any view component/layer representation of any coded video sequence (CVS) that refers to the VPS;

construct, based on pictures in a reference picture set, a first reference picture list and a second reference picture list for a current view component/layer representation of a CVS that refers to the VPS, wherein at least one inter-view/layer reference picture is present in the first reference picture list for the current view component/layer representation; and decode the current view component/layer representation, wherein when the syntax element indicates that inter-view/layer reference pictures are never included in the second reference picture list for any view component/layer representation of any CVS that refers to the VPS, the current view component/layer representation is decoded without use of inter-view/layer reference pictures in the second reference picture list for the current view component/layer representation.

16. The video decoding device of claim 15, wherein the one or more processors are configured to:

perform a disparity vector derivation process that checks one or more blocks that neighbor a current block of the current view component/layer representation in order to determine a disparity vector for the current block, and wherein the one or more processors are configured such that as part of performing the disparity vector derivation process, when the syntax element indicates that inter-view/layer reference pictures are never included in the second reference picture list for any view component/layer representation of any CVS that refers to the VPS, the one or more processors do not check motion information corresponding to the second reference picture list for the current view component/layer representation.

17. The video decoding device of claim 15, wherein the current view component/layer representation is in a particular layer in a plurality of layers in the bitstream, and the one or more processors are configured to:
obtain, for each respective layer from the plurality of layers, a respective syntax element for the respective layer, the respective syntax element indicating whether inter-view/layer reference pictures are ever included in respective second reference picture lists for view components/layer representations that are in the respective layer and that are in any CVS that refers to the VPS.

18. The video decoding device of claim 15, wherein the one or more processors are further configured to obtain, from the bitstream, reference picture list modification (RPLM) syntax elements for modifying the second reference picture list for the current view component/layer representation, wherein when the syntax element indicates that inter-view/layer reference pictures are never included in the second reference picture list for any view component/layer representation of any CVS that refers to the VPS, each of the RPLM syntax elements includes fewer bits than when the syntax element indicates that inter-view/layer reference pictures can be included in the second reference picture lists for view component/layer representations of any coded video sequence that refers to the VPS.

19. The video decoding device of claim 15, wherein the syntax element is a first syntax element and the one or more processors are configured to obtain, from the bitstream, a second syntax element, the second syntax element indicating a starting position of inter-view/layer reference pictures in the first reference picture list for the current view component/layer representation.

20. The video decoding device of claim 15, wherein the one or more processors are configured to:
perform a disparity vector derivation process that checks one or more blocks that neighbor a current block of the current view component/layer representation in order to determine a disparity vector for the current block, and
wherein the one or more processors are configured such that, as part of performing the disparity vector derivation process, when the syntax element indicates that inter-view/layer reference pictures are never included in the second reference picture list for any view component/layer representation of any CVS that refers to the VPS, the one or more processors store at most one implicit disparity vector for each of the one or more blocks that neighbor the current block.

21. The video decoding device of claim 15, wherein the one or more processors are configured to:
when the syntax element indicates that inter-view/layer reference pictures are never included in the second reference picture list for any view component/layer representation of any coded video sequence that refers to the VPS, a candidate list does not include a candidate that corresponds to an inter-view/layer reference picture; and
determine, based on a particular candidate in the candidate list, a motion vector for a current block of the current view component/layer representation.

22. The video decoding device of claim 15, wherein the one or more processors are configured to:

when the syntax element indicates that inter-view/layer reference pictures are never included in the second reference picture list for any view component/layer representation of any CVS that refers to the VPS, avoid checking of whether a reference picture from the second reference picture list for the current view component/layer representation is an inter-view/layer reference picture; and
when the syntax element indicates that inter-view/layer reference pictures are never included in the second reference picture list for any view component/layer representation of any CVS that refers to the VPS, enable, without checking a type of a particular reference picture in the second reference picture list for the current view component/layer representation, a residual predictor generation process for the second reference picture list for the current view component/layer representation if a prediction unit (PU) of a current coding unit (CU) of the current view component/layer representation has a motion vector that indicates a location in the particular reference picture.

23. The video decoding device of claim 15, wherein the one or more processors are configured to:
when the syntax element indicates that inter-view/layer reference pictures are never included in the second reference picture list for any view component/layer representation of any CVS that refers to the VPS, perform view synthesis prediction only using inter-view/layer reference pictures inserted into the first reference picture list for the current view component/layer representation; and
when the syntax element indicates that inter-view/layer reference pictures are never included in the second reference picture list for any view component/layer representation of any CVS that refers to the VPS, not consider an inter-view/layer reference picture set or inter-view/layer reference pictures when constructing an initial version of the second reference picture list for the current view component/layer representation.

24. The video decoding device of claim 15, wherein the video decoding device comprises at least one of:
an integrated circuit; and
a microprocessor.

25. A video decoding device comprising:
means for obtaining, from a video parameter set (VPS) in a bitstream, a syntax element that indicates whether inter-view/layer reference pictures are ever included in a second reference picture list for any view component/layer representation of any coded video sequence (CVS) that refers to the VPS;
means for constructing, based on pictures in a reference picture set, a first reference picture list and a second reference picture list for a current view component/layer representation of a CVS that refers to the VPS, wherein at least one inter-view/layer reference picture is present in the first reference picture list for the current view component/layer representation; and
means for decoding the current view component/layer representation, wherein when the syntax element indicates that inter-view/layer reference pictures are never included in the second reference picture list for any view component/layer representation of any CVS that refers to the VPS, the current view component/layer representation is decoded without use of inter-view/layer reference pictures in the second reference picture list for the current view component/layer representation.

* * * * *